(12) United States Patent
Esenlik et al.

(10) Patent No.: US 11,265,538 B2
(45) Date of Patent: Mar. 1, 2022

(54) METHOD AND APPARATUS FOR IMAGE FILTERING WITH ADAPTIVE MULTIPLIER COEFFICIENTS

(71) Applicant: Huawei Technologies Co., Ltd., Shenzhen (CN)

(72) Inventors: Semih Esenlik, Munich (DE); Anand Meher Kotra, Munich (DE); Zhijie Zhao, Munich (DE); Jianle Chen, Santa Clara, CA (US)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 17/016,033

(22) Filed: Sep. 9, 2020

(65) Prior Publication Data

US 2020/0413054 A1    Dec. 31, 2020

Related U.S. Application Data

(63) Continuation of application No. PCT/EP2018/058090, filed on Mar. 29, 2018.

(30) Foreign Application Priority Data

Mar. 9, 2018  (WO) ................. PCT/EP2018/055979

(51) Int. Cl.
*H04N 19/117* (2014.01)
*H04N 19/132* (2014.01)
(Continued)

(52) U.S. Cl.
CPC ......... *H04N 19/117* (2014.11); *H04N 19/132* (2014.11); *H04N 19/1887* (2014.11); *H04N 19/82* (2014.11)

(58) Field of Classification Search
CPC ... H04N 19/1887; H04N 19/82; H04N 19/117
(Continued)

(56) References Cited

U.S. PATENT DOCUMENTS

2012/0134685 A1* 5/2012 Ohtomo ............... H04B 10/613
                                                        398/208
2012/0183081 A1* 7/2012 Liu ....................... H04N 19/117
                                                        375/240.29
(Continued)

FOREIGN PATENT DOCUMENTS

CN          1964490 A      5/2007
CN        101163246 A      4/2008
(Continued)

OTHER PUBLICATIONS

Ugur et al, "Efficient Implementation of Adaptive Interpolation Filters for Low Complexity Video Coding", IEEE Transactions on Consumer Electronics. vol. 55, No. 1, Feb. 2009, pp. 257-263 (Year: 2009).*

(Continued)

*Primary Examiner* — Amir Shahnami
(74) *Attorney, Agent, or Firm* — Leydig, Voit & Mayer, Ltd.

(57) ABSTRACT

An apparatus and a method for filtering reconstructed images, in particular, video images, with adaptive multiplicative filters. The efficiency of the filtering operation is increased by restricting the allowable values of the filter coefficients to those that have only a limited number of "ones" in the binary representation.

19 Claims, 9 Drawing Sheets

(51) Int. Cl.
   *H04N 19/169* (2014.01)
   *H04N 19/82* (2014.01)
(58) Field of Classification Search
   USPC .......................................................... 375/240
   See application file for complete search history.

(56) References Cited

U.S. PATENT DOCUMENTS

| | | | |
|---|---|---|---|
| 2013/0266060 | A1 | 10/2013 | Budagavi |
| 2014/0010278 | A1 | 1/2014 | Lou et al. |
| 2015/0055862 | A1* | 2/2015 | Omayu .................. H04N 5/217 |
| | | | 382/167 |

FOREIGN PATENT DOCUMENTS

| | | | |
|---|---|---|---|
| CN | 101878648 | A | 11/2010 |
| CN | 102656888 | A | 9/2012 |
| CN | 103700072 | A | 4/2014 |
| CN | 104734668 | A | 6/2015 |
| CN | 105808206 | A | 7/2016 |
| CN | 107295353 | A | 10/2017 |
| EP | 1626499 | A1 | 2/2006 |
| JP | 2014520416 | A | 8/2014 |
| RU | 2010119176 | A | 11/2011 |
| WO | 2016130801 | A1 | 8/2016 |

OTHER PUBLICATIONS

Ugur et al., "Efficient Implementation of Adaptive Interpolation Filters for Low Complexity Video Coding," IEEE Transactions on Consumer Electronics, vol. 55, No. 1, XP011255284, pp. 257-263, Institute of Electrical and Electronics Engineers, New York, New York (Feb. 2009).

Vatis et al., "Coding of Coefficients of two-dimensional non-separable Adaptive Wiener Interpolation Filter," Visual Communications and Image Processing; San Jose, vol. 5960, Jul. 12, 2005, total 9 pages, XP002419200 (Jul. 2005).

Tsai et al., "Adaptive Loop Filtering for Video Coding," IEEE Journal of Selected Topics in Signal Processing, vol. 7, No. 6, pp. 934-945, Institute of Electrical and Electronics Engineers, New York, New York (Dec. 2013).

"Series H: Audiovisual and Multimedia Systems Coding of moving video, Implementors Guide for H.263: Video coding for low bit rate communication," ITU-T H.263, total 10 pages, International Telecommunication Union, Geneva, Switzerland (Aug. 5, 2005).

"Series H: Audiovisual and Multimedia Systems Infrastructure of audiovisual services—Coding of moving video, Information technology—Generic coding of moving pictures and associated audio information: Video: Frame packing arrangement signalling for 3D content, Amendment 4," ITU-T H.262, total 238 pages, International Telecommunication Union, Geneva, Switzerland (Feb. 2012).

"Line Transmission of Non-Telephone Signals, Video Codec for Audiovisual Services at p×64 kbits," ITU-T H.261, total 29 pages (Mar. 1993).

"Series H: Audiovisual and Multimedia Systems, Infrastructure of audiovisual services—Coding of moving video, High efficiency video coding," ITU-T H.265, total 692 pages, International Telecommunication Union, Geneva, Switzerland (Feb. 2018).

"Series H: Audiovisual and Multimedia Systems, Infrastructure of audiovisual services—Coding of moving video, Advanced video coding for generic audiovisual services," ITU-T H.264, total 812 pages, International Telecommunication Union, Geneva, Switzerland (Apr. 2017).

RU/2020/133183/07 (060524), Office Action/Search Report, dated Apr. 28, 2021.

"An Adaptive Interpolation Filtering Technique," Joint Collaborative Team on Video Coding (JCT-VC) of ITU-T SG16 WP3 and ISO/IEC JTC1/SC29/WG11, Document: JCTVC-E284, 5th Meeting: Geneva, CH, pp. 1-8 (Mar. 16-23, 2011).

* cited by examiner

METHOD AND APPARATUS FOR IMAGE FILTERING WITH ADAPTIVE MULTIPLIER COEFFICIENTS

CROSS-REFERENCE TO RELATED APPLICATIONS

This application is a continuation of International Application No. PCT/EP2018/058090, filed on Mar. 29, 2018, the disclosure of which is hereby incorporated by reference in its entirety.

TECHNICAL FIELD

Embodiments of the invention relate to the field of picture processing, for example video picture and/or still picture coding. New methods and apparatuses for image filtering with a filter having adaptive multiplier filter coefficients are provided.

BACKGROUND

Video coding (video encoding and decoding) is used in a wide range of digital video applications, for example broadcast digital TV, video transmission over internet and mobile networks, real-time conversational applications such as video chat, video conferencing, DVD and Blu-ray discs, video content acquisition and editing systems, and camcorders of security applications.

Since the development of the block-based hybrid video coding approach in the H.261 standard in 1990, new video coding techniques and tools have been developed and have formed the basis for new video coding standards. One of the goals of most of the video coding standards was to achieve a bitrate reduction compared to its predecessor without sacrificing picture quality. Further video coding standards comprise MPEG-1 video, MPEG-2 video, ITU-T H.262/MPEG-2, ITU-T H.263, ITU-T H.264/MPEG-4, Part 10, Advanced Video Coding (AVC), ITU-T H.265, High Efficiency Video Coding (HEVC), and extensions, e.g., scalability and/or three-dimensional (3D) extensions, of these standards.

In the following, some background information about adaptive filtering will be summarized.

Adaptive filtering for video coding serves to minimize the mean square error between originals and decoded samples by using a Wiener-based adaptive filter. In particular, the proposed Adaptive Loop Filter (ALF) is located at the last processing stage for each picture and can be regarded as a tool to catch and fix artifacts from previous stages. The suitable filter coefficients are determined by the encoder and explicitly signaled to the decoder.

General information about adaptive filtering can be found in the article "Adaptive Loop Filtering for Video Coding", by Chia-Yang Tsai, Ching-Yeh Chen, Tomoo Yamakage, In Suk Chong, Yu-Wen Huang, Chih-Ming Fu, Takayuki Itoh, Takashi Watanabe, Takeshi Chujoh, Marta Karczewicz, and Shaw-Min Lei, published in: IEEE Journal of Selected Topics in Signal Processing (Volume: 7, Issue: 6, December 2013).

The description given in the above document describes a specific implementation of filtering operation with adaptive filter coefficients. The general principles of the operation can be described as follows.

Generally, the filtering equation reads:

$$R'(i,j) = \sum_{k=-L/2}^{L/2} \sum_{l=-L/2}^{L/2} f(k,l) \times R(i+k, j+l)$$

Herein, R(i,j) is a sample in a picture frame before filtering at the coordinate (i,j).
R'(i,j) is a sample in a picture frame after filtering. f(k,l) are the filter coefficients.

An example filter kernel is depicted in FIG. 4. In this example C20 is the center coordinate of the filter kernel (k=0, l=0), and L is equal to 8.

In the example the filter kernel is symmetric around the center. This may not be generally true.

In case of using integer arithmetic, the filtering equation may be written as:

$$R'(i,j) = \left(\left(\sum_{k=-\frac{L}{2}}^{\frac{L}{2}} \sum_{l=-\frac{L}{2}}^{\frac{L}{2}} f(k,l) \times R(i+k, j+l)\right) + \text{offset}\right) >> N$$

Here, N is a number of a bit-shift of the output, i.e. the output is divided by a normalization factor. In particular, N may be predefined. The "offset" is a scalar to compensate for loss in the integer arithmetic. In case of a bit shift by N, the offset may be $2^{(N-1)}$. In the above equation the filtering coefficients f(k,l) can only have values that are integers and not fractional numbers. The implementation of the filtering equation according to integer arithmetic is important in order to ensure precise implementations in the hardware. The right shift operation ">>N" has the effect of division by $2^N$ followed by a rounding down operation.

Usually (but not necessarily), the following equation holds true if no change in the average illumination level is desired.

$$2^N = \sum_{k=-\frac{L}{2}}^{\frac{L}{2}} \sum_{l=-\frac{L}{2}}^{\frac{L}{2}} f(k,l)$$

In the encoder, the filter coefficients are estimated by minimizing the expected value of the error between the original and the filtered pixel:

$$E\left(\left(O(i,j) - \sum_{k=-\frac{L}{2}}^{\frac{L}{2}} \sum_{l=-\frac{L}{2}}^{\frac{L}{2}} f(k,l) \times R(i+k, j+l)\right)^2\right)$$

In the above equation, O(i,j) denotes the sample of the original picture.

FIG. 5 shows some typical exemplary filter shapes for adaptive filters. The drawing on the left shows a 5×5 diamond filter (13 tap filter with 7 unique coefficients), the middle drawing—a 7×7 diamond filter (25 tap filter with 13 unique coefficients), and the drawing on the right—a 9×9 diamond filter (41 tap filter with 21 unique coefficients).

The term "adaptive" filtering refers to the fact that the filtering process can be adjusted by the encoder. This concerns, for instance, the filter shape, the filter size, the number of filtering coefficients, and the values of filtering coefficients. These data, also known as "filter hints", are signaled to the decoder.

Adaptive filtering implies the following problem, when applied to filtering realizations that include multiplication, i.e., wherein the filter coefficients are so-called multiplicative or multiplier coefficients. In other words, the following problem which the invention intends to solve relates to filtering with adaptive filter coefficients, wherein the filter coefficients that are used in multiplication operation can be individually adapted (modified). In this connection, individually means for each picture (image, frame), and/or for each pixel, and/or each coefficient.

The problem is that the implementation of the multiplication operation is costly, especially in dedicated hardware implementations. The filter application requires a comparatively large number of multiplication of filtering operations (for instance, 41 multiplications per pixel in the case of a 9×9 diamond shaped filter, as shown in FIG. 4).

This is illustrated in more detail below.

Suppose we want to multiply two unsigned, eight bit integers. The filter coefficient is C and the sample pixel A.

The multiplication process can be decomposed into 8 one-bit multiplications, each of which can be implemented as a bit shift operation in binary arithmetic, and 7 addition operations as shown below. Hence roughly 1 multiplication is equivalent to 7 additions. The problem is that the multiplication process requires a large amount of computation. Hence it is costly to implement in dedicated hardware.

fractional positions (half pixel and quarter pixel positions in the drawing). In the example, the whole filter set is adapted based on the motion vector, but the filter coefficients are not adapted individually.

In the figure, the large rounds correspond to actual sample positions in an image, and the smaller rounds are the fractional positions that are generated by application of the interpolation filtering operation. In the specific example, there are 3 fractional positions (left quarter pel, half pel and right quarter pel) positions in between two actual image sample positions. On the left-hand side of the drawing, an interpolation filter applied for interpolating half pixel (half-pel) positions is shown. The right-hand side of the drawing illustrates an interpolation filter to be used for quarter pixel (quarter-pel) positions. Although these filters are different from each other, each interpolation filter is a fixed filter. As indicated, the example of FIG. 6 has been provided for illustrative purposes only and does not form a part of the invention.

The invention aims to provide an improved concept of multiplicative adaptive filtering, which can simplify the multiplication operation and reduce the multiplication operation effort.

SUMMARY

Embodiments of the invention are defined by the features of the independent claims and further advantageous implementations of the embodiments by the features of the dependent claims.

|   |   |   |   |   |   | + | + | + | C[0]A[7] |
|---|---|---|---|---|---|---|---|---|---|
|   |   |   |   |   | + | C[2]A[7] | C[1]A[7] | C[1]A[6] |   |
|   |   |   |   | + | C[3]A[7] | C[3]A[6] | C[2]A[6] | C[2]A[5] |   |
| + | C[7]A[7] | C[7]A[6] | C[7]A[5] | C[7]A[4] | C[7]A[3] | C[7]A[2] | C[3]A[5] | C[3]A[4] |   |
| P[15] | P[14] | P[13] | P[12] | P[11] | P[10] | P[9] | C[7]A[1] | C[7]A[0] |   |
|   |   |   |   |   |   |   | P[8] | P[7] |   |
|   |   | C[0]A[6] | C[0]A[5] | C[0]A[4] | C[0]A[3] | C[0]A[2] | C[0]A[1] | C[0]A[0] |
|   |   | C[1]A[5] | C[1]A[4] | C[1]A[3] | C[1]A[2] | C[1]A[1] | C[1]A[0] | 0 |
|   |   | C[2]A[4] | C[2]A[3] | C[2]A[2] | C[2]A[1] | C[2]A[0] | 0 | 0 |
|   |   | C[3]A[3] | C[3]A[2] | C[3]A[1] | C[3]A[0] | 0 | 0 | 0 |
|   |   | ... |   |   |   |   |   |   |
|   |   | ... |   |   |   |   |   |   |
|   |   | ... |   |   |   |   |   |   |
|   |   | 0 | 0 | 0 | 0 | 0 | 0 | 0 |
|   |   | P[6] | P[5] | P[4] | P[3] | P[2] | P[1] | P[0] |

Herein, the 8 bit unsigned filter coefficient C is shown in binary representation, where C[0] is the least significant bit of coefficient C and C[7] is the most significant bit. Similarly A[7], A[6], . . . A[0] are the bits corresponding to the most significant bit to the least significant bit in order. The operation P=C*A in binary arithmetic is demonstrated and the result in shown in the lowest line.

In the example of FIG. 4, the filter kernel includes 41 filter taps, meaning that in order to process a pixel sample, 41 multiplication operations are necessary.

It is pointed out that the invention and the above-described problem that it solves are specifically related to adaptive filtering with multiplier filter coefficients. The problem does not apply to fixed filters, and, in particular, to filtering operations employing multiple fixed filters.

An example for employing multiple fixed filters is interpolation filtering, for interpolating at fractional pixel positions in the inter-prediction, which is illustrated in FIG. 6.

Many known codecs employ interpolation filtering using fixed interpolation filters. Although the filter coefficients are fixed for a filter, there are multiple filters for different According to a first aspect of the invention, an apparatus for filtering a set of samples of an image using a filter with adaptive multiplier coefficients represented by integer numbers is provided. The apparatus comprises processing circuitry which is configured to determine the value of at least one multiplier coefficient of the filter so as to be within a set of allowed values so that the binary representation of the absolute value of the at least one multiplier coefficient with a predetermined number L of digits includes at least one "zero", and to filter the set of samples of an image with the filter.

According to a second aspect of the invention, a method for filtering a set of samples of an image using a filter with adaptive multiplier coefficients represented by integer numbers is provided. The method comprises the step of determining the value of at least one multiplier coefficient of the filter so as to be within a set of allowed values so that the binary representation of the absolute value of the at least one multiplier coefficient with a predetermined number L of digits includes at least one "zero" and the step of filtering the set of samples of an image with the filter.

According to the present disclosure, a set of samples of an image may, for instance, be a sample of a video signal or a still image signal. The processing circuitry can be implemented by any combination of software and/or hardware. The set of allowed values may, in particular, be a predetermined set of allowed values. Generally, the invention is also applicable to other sets of signal samples than images, for instance signals including audio data.

It is the particular approach of the invention to restrict the values that can be assumed by the filter coefficients of an adaptive multiplication filter in such a way that the multiplication operation is simplified. Specifically, the allowable values of the filter coefficients are restricted so that within a predetermined number of binary digits for expressing the absolute values, only a limited number of "ones" is allowed. This allows the simplification of the multiplication operations for filtering and thus renders the filtering operation more efficient.

As will be shown below, the smaller the number of allowed "ones" in a predetermined overall number of binary digits, the better the efficiency gain in performing the filtering operation. For instance, the best efficiency gain can be achieved if any value that can be assumed by the coefficient values includes only up to a single "1", i.e. at most one "1".

In accordance with embodiments, the highest absolute value of the set of allowed values is restricted to a predetermined maximum value $N_{max}$.

In accordance with embodiments, the binary representation of the absolute value of the at least one multiplier coefficient includes at most two "ones". More specifically, the binary representation of the absolute value of the at least one multiplier coefficient includes at most one "one". As indicated above, and as will be described in detail below, the simplification in performing the multiplication operation for filtering and thus the gain and processing efficiency is higher the more zeroes (hence: the fewer ones) there are in the binary representation of the allowed coefficient values. Thus the most efficient case is when there is only one "one", whereas, for instance, two allowed "ones" still give a good result. Of course, what is beneficial much depends on the details of the situation, and, in particular, for large filters, also having three or more "ones" may still be beneficial.

Generally, the set of allowed values is applicable to at least one multiplier coefficient of the filter.

In accordance with embodiments, the set of allowed values is applied to all multiplier coefficients of the filter.

In accordance with alternative embodiments, the multiplier coefficients are further grouped into at least two groups and the multiplier coefficients of one of the groups is restricted to the set of allowed values. The multiplier coefficients in the other group or groups can, for instance, assume all values within a predetermined range, or can be restricted in accordance with other predetermined rules. More specifically, the multiplier coefficients of another one of the groups are, for instance, allowed to assume all values within a range defined by a predetermined maximum of the absolute value.

In accordance with embodiments, a set of samples of an image means a set of samples of a video image. More specifically, the apparatus may be configured to individually adapt the multiplier coefficients for each picture and each pixel.

In accordance with a further particular aspect of the invention, an apparatus for encoding a current set of samples of an image including a plurality of pixels is provided. The apparatus comprises an encoder with a decoder for reconstructing the current set and an apparatus according to the first aspect of the invention for filtering the reconstructed set.

In accordance with embodiments, said encoding apparatus further comprises processing circuitry which is configured to map the values of the multiplier coefficients to binary code words and to include the code words into a bit stream for being transmitted to a decoding apparatus.

More specifically, the length of the code words depends on the number of distinct multiplier coefficient values. In other words, there are as many codewords as possible filter coefficient values. The codeword to value mapping (which is a one-to-one mapping) can be a fixed mapping, or can change depending on signaled side information.

In accordance with embodiments, the processing circuitry is further configured to perform a prediction of the multiplier coefficients of the filter and to determine residual multiplier coefficients by comparing the actually determined values with the predicted values resulting from the prediction. The mapping to binary code words is then applied to the residual multiplier coefficients. In this case, prediction control information might be further included into the bit stream so that a decoding apparatus receiving the bit stream is aware of the prediction method applied and can reconstruct the multiplier coefficients of the filter from the encoded residual multiplier coefficients. Alternatively, the applied prediction method can be predefined, hence applied in the same manner in the encoder and decoder without any transmitted side information. Possible prediction methods may include but are not limited to prediction using predefined filter predictors and prediction from previously signaled filter coefficients. Because the values of residual filter coefficients, expressing the difference between an actual filter coefficient and the respective predicted filter coefficient, are generally smaller in absolute value than the actual coefficients, the amount and thus the size of the codewords can be smaller, which additionally reduces information to be signaled to the decoder.

Alternatively, the mapping of multiplier coefficients to codewords for including in the bit stream can be performed on the multiplier coefficients determined according to the first aspect of the invention, without performing prediction processing.

In accordance with a still further aspect of the invention, an apparatus for decoding a coded current set of samples of an image including a plurality of pixels is provided. The apparatus comprises a decoder for reconstructing the current set and an apparatus according to the first aspect of the invention for filtering the reconstructed set.

In accordance with embodiments, the processing circuitry of the apparatus according to the first aspect of the invention is further configured to obtain multiplier coefficients from binary codewords included in a received bit stream by applying a mapping operation.

In particular, the obtained multiplier coefficients may be the filter coefficients to be used for the filtering. Alternatively, the obtained multiplier coefficients may be residual multiplier coefficients representing the difference between the actual coefficient values and multiplier coefficients predicted according to a prediction scheme. The prediction scheme may be indicated by prediction control information further included in the received bit stream. In that case, the processing circuitry is further configured to determine the values of the filter coefficients by reconstructing them from the obtained residual multiplier coefficients and the prediction control information. Alternatively, the prediction scheme (prediction method) can be predefined and hence applied in the same manner in the encoder and decoder without any transmitted prediction control information. The processing circuitry then determines the values of the filter coefficients by reconstructing them from the obtained residual multiplier coefficients.

In accordance with embodiments, the determination by the processing circuitry further includes performing a determination as to whether or not the determined value of the at least one multiplier coefficient, obtained directly from the received bit stream by the mapping operation or by reconstruction from the obtained residual multiplier coefficients are within the set of allowed values, and, if not, converting the determined value to the nearest value that is within the set of allowed values.

Thereby, it is guaranteed that the filter coefficients that are applied on the reconstructed image samples obey the rules according to the invention.

Details of one or more embodiments are set forth in the accompanying drawings and the description below. Other features, objects, and advantages will be apparent from the description, drawings, and claims.

BRIEF DESCRIPTION OF THE DRAWINGS

In the following, embodiments of the invention are described in more detail with reference to the attached figures and drawings, in which.

Figure 1:
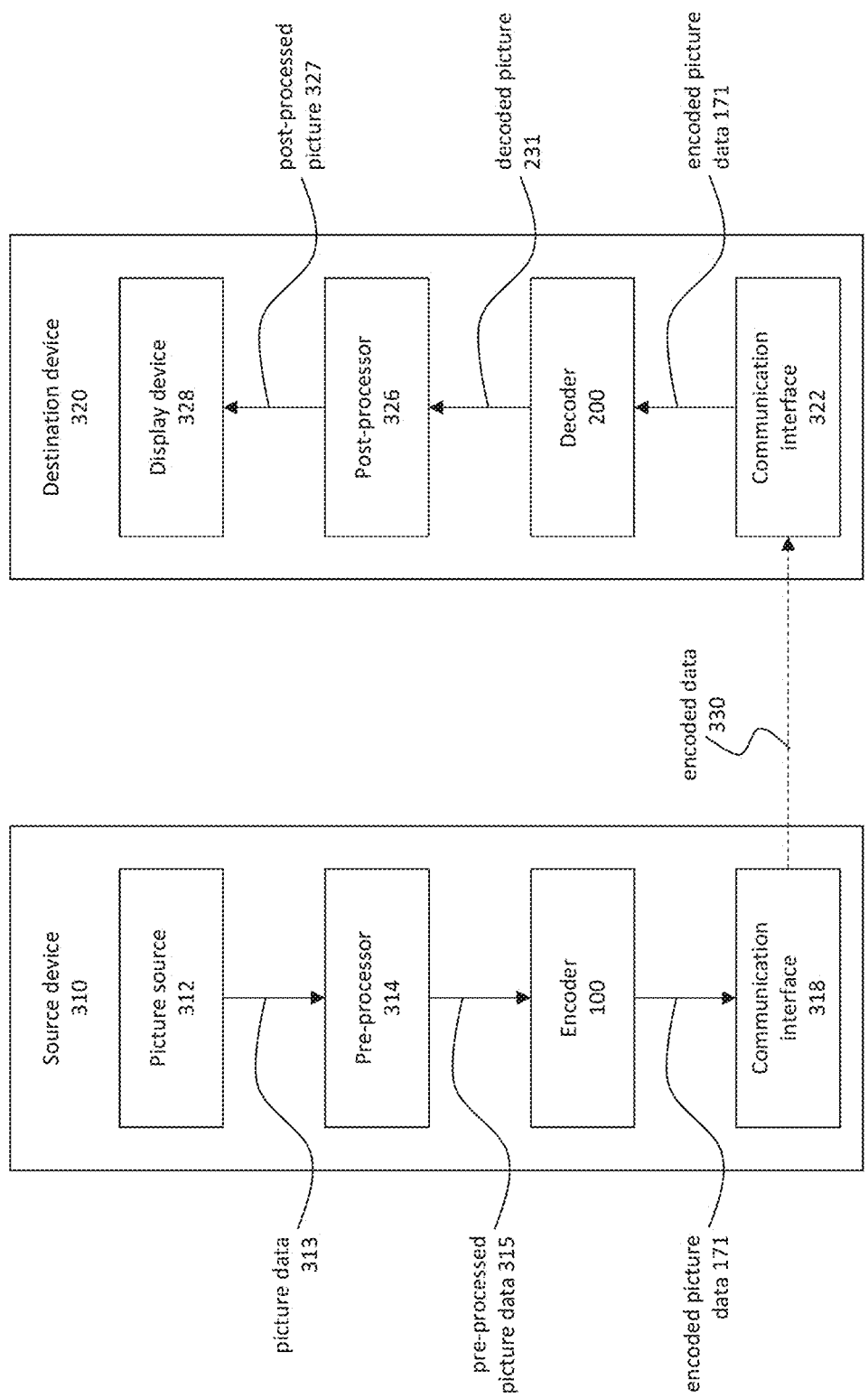
FIG. 1 is a block diagram showing an example of a video coding system configured to implement embodiments of the invention.

In the drawings, identical reference signs refer to identical or at least functionally equivalent features.

DETAILED DESCRIPTION OF THE EMBODIMENTS

In the following description, reference is made to the accompanying figures, which form part of the disclosure, and which show, by way of illustration, specific aspects of embodiments of the invention or specific aspects in which embodiments of the invention may be used. It is understood that embodiments of the invention may be used in other aspects and comprise structural or logical changes not depicted in the figures. The following detailed description, therefore, is not to be taken in a limiting sense, and the scope of the invention is defined by the appended claims.

For instance, it is understood that a disclosure in connection with a described method may also hold true for a corresponding device or system configured to perform the method and vice versa. For example, if one or a plurality of specific method steps are described, a corresponding device may include one or a plurality of units, e.g., functional units, to perform the described one or plurality of method steps (e.g., one unit performing the one or plurality of steps, or a plurality of units each performing one or more of the plurality of steps), even if such one or more units are not explicitly described or illustrated in the figures. On the other hand, for example, if a specific apparatus is described based on one or a plurality of units, e.g., functional units, a corresponding method may include one step to perform the functionality of the one or plurality of units (e.g., one step performing the functionality of the one or plurality of units, or a plurality of steps each performing the functionality of one or more of the plurality of units), even if such one or plurality of steps are not explicitly described or illustrated in the figures. Further, it is understood that the features of the various exemplary embodiments and/or aspects described herein may be combined with each other, unless specifically noted otherwise.

Video coding typically refers to the processing of a sequence of pictures, which form the video or video sequence. Instead of the term picture the terms frame or image may be used as synonyms in the field of video coding. Video coding comprises two parts, video encoding and video decoding. Video encoding is performed at the source side, typically comprising processing (e.g., by compression) the original video pictures to reduce the amount of data required for representing the video pictures (for more efficient storage and/or transmission). Video decoding is performed at the destination side and typically comprises the inverse processing compared to the encoder to reconstruct the video pictures. Embodiments referring to "coding" of video pictures (or pictures in general, as will be explained later) shall be understood to relate to both, "encoding" and "decoding" of video pictures. The combination of the encoding part and the decoding part is also referred to as CODEC (COding and DECoding).

In case of lossless video coding, the original video pictures can be reconstructed, i.e. the reconstructed video pictures have the same quality as the original video pictures (assuming no transmission loss or other data loss during storage or transmission). In case of lossy video coding, further compression, e.g., by quantization, is performed, to reduce the amount of data representing the video pictures, which cannot be completely reconstructed at the decoder, i.e. the quality of the reconstructed video pictures is lower or worse compared to the quality of the original video pictures.

Several video coding standards since H.261 belong to the group of "lossy hybrid video codecs" (i.e. combine spatial and temporal prediction in the sample domain and 2D transform coding for applying quantization in the transform domain). Each picture of a video sequence is typically partitioned into a set of non-overlapping blocks and the coding is typically performed on a block level. In other words, at the encoder the video is typically processed, i.e. encoded, on a block (video block) level, e.g., by using spatial (intra picture) prediction and temporal (inter picture) prediction to generate a prediction block, subtracting the prediction block from the current block (block currently processed/to be processed) to obtain a residual block, transforming the residual block and quantizing the residual block in the transform domain to reduce the amount of data to be transmitted (compression), whereas at the decoder the inverse processing compared to the encoder is applied to the encoded or compressed block to reconstruct the current block for representation. Furthermore, the encoder duplicates the decoder processing loop such that both will generate identical predictions (e.g., intra- and inter predictions) and/or re-constructions for processing, i.e. coding, the subsequent blocks.

As video picture processing (also referred to as moving picture processing) and still picture processing (the term processing comprising coding), share many concepts and technologies or tools, in the following the term "picture" or "image" and equivalent the term "picture data" or "image data" is used to refer to a video picture of a video sequence (as explained above) and/or to a still picture to avoid unnecessary repetitions and distinctions between video pictures and still pictures, where not necessary. In case the description refers to still pictures (or still images) only, the term "still picture" shall be used.

In the following embodiments of an encoder 100, a decoder 200 and a coding system 300 are described based on FIGS. 1 to 3 (before describing embodiments of the invention in more detail based on FIGS. 7 to 9).

A schematic block diagram illustrating an embodiment of a coding system 300 is given in FIG. 1, which will be described in more detail below.

Figure 2:
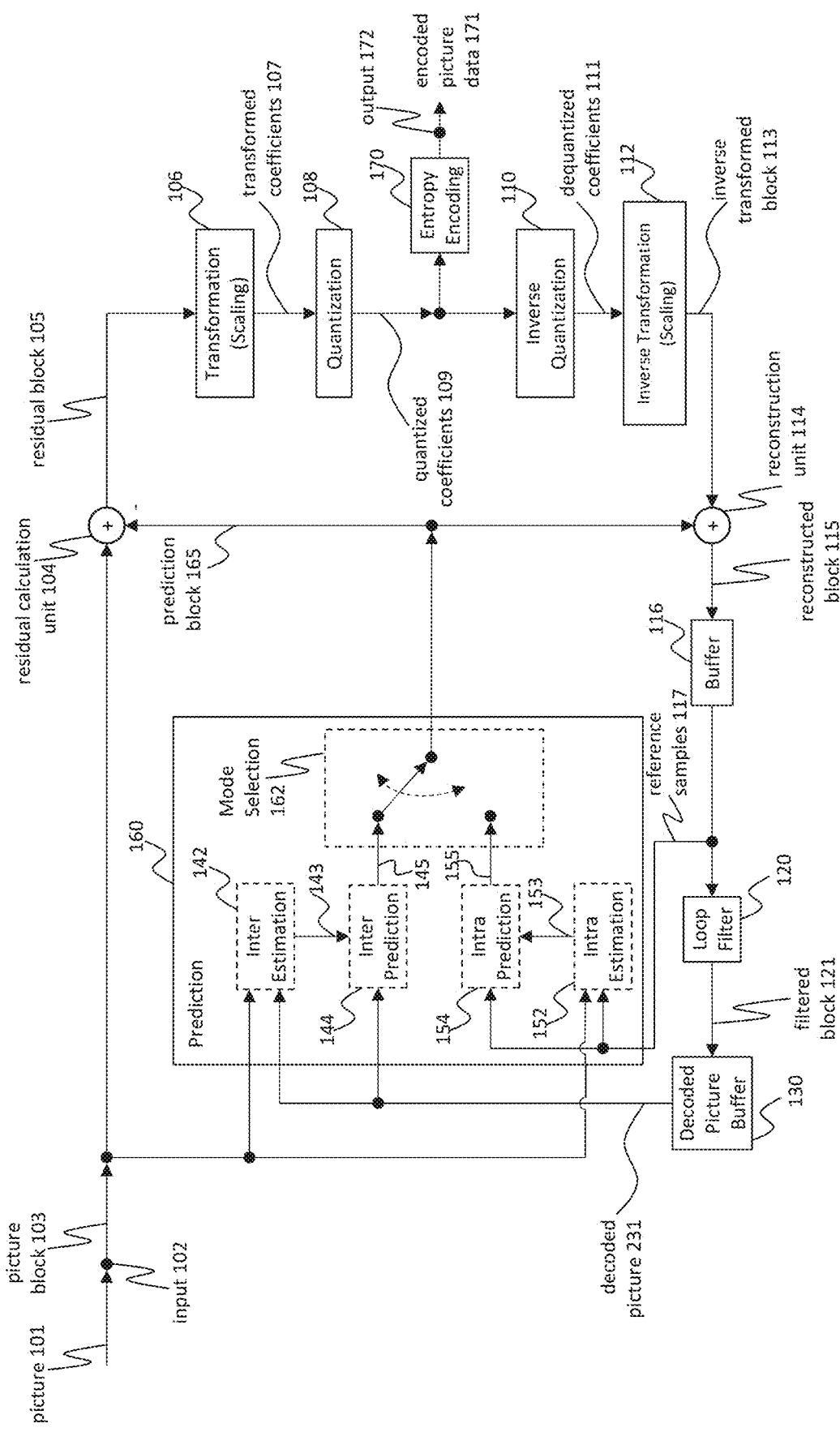
FIG. 2 is a block diagram showing an example of a video encoder configured to implement embodiments of the invention.

FIG. 2 is a block diagram showing an example structure of a video encoder, in which the invention can be implemented and which will be described in more detail below, as well.

In particular, the illustrated encoder 100 includes a "loop filter" 120, wherein the filtering operation according to the invention can be applied. However, more generally, the filtering operation is applicable at other locations of the codec, for instance in an interpolation filter. Still more generally, the invention applies not only to video but also to still picture coding.

Figure 3:
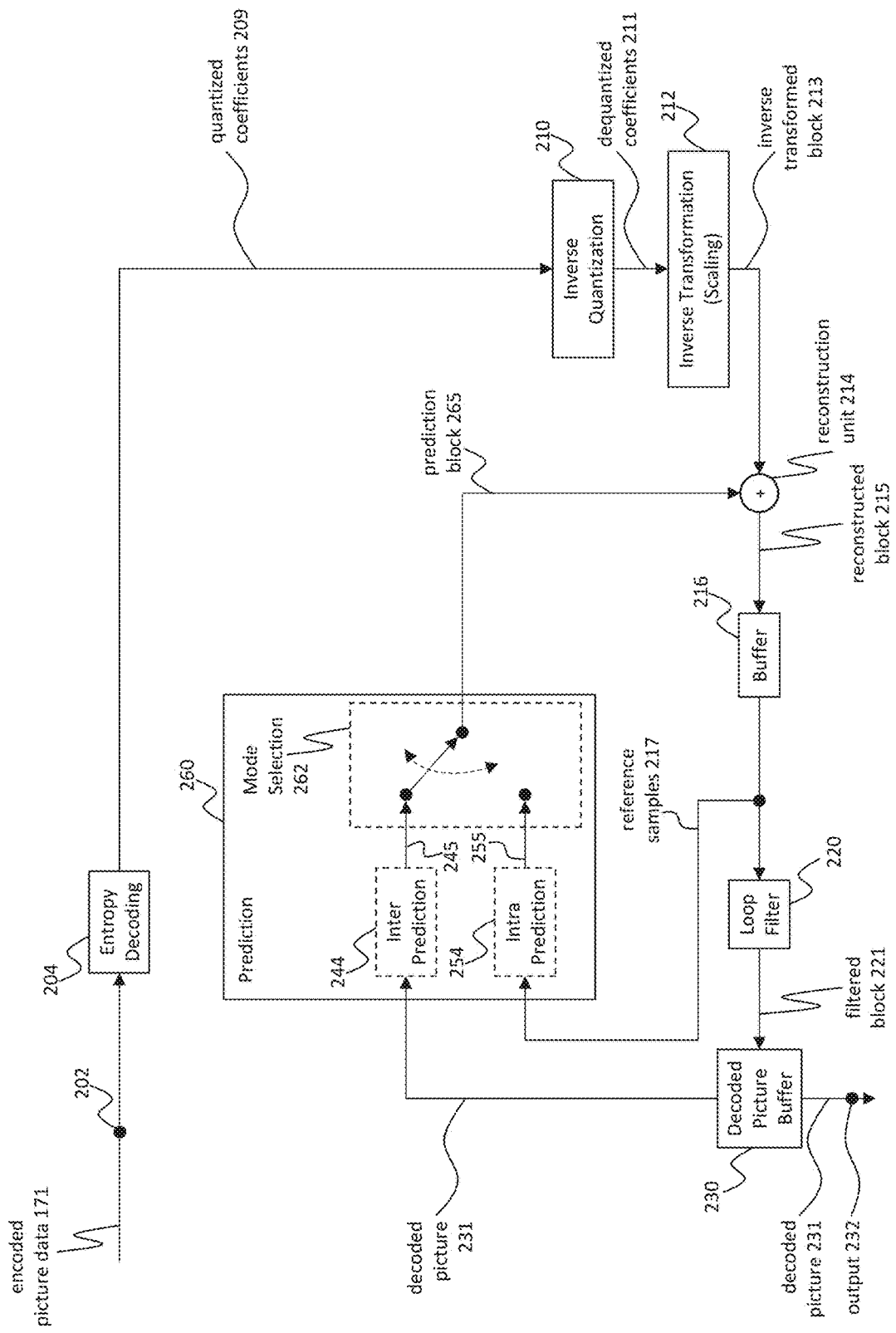
FIG. 3 is a block diagram showing an example structure of a video decoder configured to implement embodiments of the invention.

FIG. 3 is a block diagram showing an example structure of a video decoder, in which the invention can be implemented and which will also be described in more detail below. Specifically, the invention is applicable, for instance, in the loop filter 220.

FIG. 1 is a conceptional or schematic block diagram illustrating an embodiment of a coding system 300, e.g., a picture coding system 300, wherein the coding system 300 comprises a source device 310 configured to provide encoded data 330, e.g., an encoded picture 330, e.g., to a destination device 320 for decoding the encoded data 330.

The source device 310 comprises an encoder 100 or encoding unit 100, and may additionally, i.e. optionally, comprise a picture source 312, a pre-processing unit 314, e.g., a picture pre-processing unit 314, and a communication interface or communication unit 318.

The picture source 312 may comprise or be any kind of picture capturing device, for example for capturing a real-world picture, and/or any kind of a picture generating device, for example a computer-graphics processor for generating a computer animated picture, or any kind of device for obtaining and/or providing a real-world picture, a computer animated picture (e.g., a screen content, a virtual reality (VR) picture) and/or any combination thereof (e.g., an augmented reality (AR) picture). In the following, all these kinds of pictures or images and any other kind of picture or image will be referred to as "picture" "image" or "picture data" or "image data", unless specifically described otherwise, while the previous explanations with regard to the terms "picture" or "image" covering "video pictures" and "still pictures" still hold true, unless explicitly specified differently.

A (digital) picture is or can be regarded as a two-dimensional array or matrix of samples with intensity values. A sample in the array may also be referred to as pixel (short form of picture element) or a pel. The number of samples in horizontal and vertical direction (or axis) of the array or picture define the size and/or resolution of the picture. For representation of color, typically three color components are employed, i.e. the picture may be represented or include three sample arrays. In RGB format or color space a picture comprises a corresponding red, green and blue sample array. However, in video coding each pixel is typically represented in a luminance/chrominance format or color space, e.g., YCbCr, which comprises a luminance component indicated by Y (sometimes also L is used instead) and two chrominance components indicated by Cb and Cr. The luminance (or short luma) component Y represents the brightness or grey level intensity (e.g., like in a grey-scale picture), while the two chrominance (or short chroma) components Cb and Cr represent the chromaticity or color information components. Accordingly, a picture in YCbCr format comprises a luminance sample array of luminance sample values (Y), and two chrominance sample arrays of chrominance values (Cb and Cr). Pictures in RGB format may be converted or transformed into YCbCr format and vice versa, the process is also known as color transformation or conversion. If a picture is monochrome, the picture may comprise only a luminance sample array.

The picture source 312 may be, for example a camera for capturing a picture, a memory, e.g., a picture memory, comprising or storing a previously captured or generated picture, and/or any kind of interface (internal or external) to obtain or receive a picture. The camera may be, for example, a local or integrated camera integrated in the source device, the memory may be a local or integrated memory, e.g., integrated in the source device. The interface may be, for example, an external interface to receive a picture from an external video source, for example an external picture capturing device like a camera, an external memory, or an external picture generating device, for example an external computer-graphics processor, computer or server. The interface can be any kind of interface, e.g., a wired or wireless interface, an optical interface, according to any proprietary or standardized interface protocol. The interface for obtaining the picture data 313 may be the same interface as or a part of the communication interface 318.

Interfaces between units within each device include cable connections, USB interfaces, Communication interfaces 318 and 322 between the source device 310 and the destination device 320 include cable connections, USB interfaces, radio interfaces.

In distinction to the pre-processing unit 314 and the processing performed by the pre-processing unit 314, the picture or picture data 313 may also be referred to as raw picture or raw picture data 313.

Pre-processing unit 314 is configured to receive the (raw) picture data 313 and to perform pre-processing on the picture data 313 to obtain a pre-processed picture 315 or pre-processed picture data 315. Pre-processing performed by the pre-processing unit 314 may, e.g., comprise trimming, color format conversion (e.g., from RGB to YCbCr), color correction, or de-noising.

The encoder 100 is configured to receive the pre-processed picture data 315 and provide encoded picture data 171 (further details will be described, e.g., based on FIG. 2).

Communication interface 318 of the source device 310 may be configured to receive the encoded picture data 171 and to directly transmit it to another device, e.g., the destination device 320 or any other device, for storage or direct reconstruction, or to process the encoded picture data 171 for respectively before storing the encoded data 330 and/or transmitting the encoded data 330 to another device, e.g., the destination device 320 or any other device for decoding or storing.

The destination device 320 comprises a decoder 200 or decoding unit 200, and may additionally, i.e. optionally, comprise a communication interface or communication unit 322, a post-processing unit 326 and a display device 328.

The communication interface 322 of the destination device 320 is configured to receive the encoded picture data 171 or the encoded data 330, e.g., directly from the source device 310 or from any other source, e.g., a memory, e.g., an encoded picture data memory.

The communication interface 318 and the communication interface 322 may be configured to transmit respectively receive the encoded picture data 171 or encoded data 330 via a direct communication link between the source device 310 and the destination device 320, e.g., a direct wired or wireless connection, including optical connection or via any kind of network, e.g., a wired or wireless network or any combination thereof, or any kind of private and public network, or any kind of combination thereof.

The communication interface 318 may be, e.g., configured to package the encoded picture data 171 into an appropriate format, e.g., packets, for transmission over a communication link or communication network, and may further comprise data loss protection.

The communication interface 322, forming the counterpart of the communication interface 318, may be, e.g., configured to de-package the encoded data 330 to obtain the encoded picture data 171 and may further be configured to perform data loss protection and data loss recovery, e.g., comprising error concealment.

Both, communication interface 318 and communication interface 322 may be configured as unidirectional communication interfaces as indicated by the arrow for the encoded picture data 330 in FIG. 1 pointing from the source device 310 to the destination device 320, or bi-directional communication interfaces, and may be configured, e.g., to send and receive messages, e.g., to set up a connection, to acknowledge and/or re-send lost or delayed data including picture data, and exchange any other information related to the communication link and/or data transmission, e.g., encoded picture data transmission.

The decoder 200 is configured to receive the encoded picture data 171 and provide decoded picture data 231 or a decoded picture 231 (further details will be described, e.g., based on FIG. 9).

The post-processor 326 of destination device 320 is configured to post-process the decoded picture data 231, e.g., the decoded picture 231, to obtain post-processed picture data 327, e.g., a post-processed picture 327. The post-processing performed by the post-processing unit 326 may comprise, e.g., color format conversion (e.g., from YCbCr to RGB), color correction, trimming, or re-sampling, or any other processing, e.g., for preparing the decoded picture data 231 for display, e.g., by display device 328.

The display device 328 of the destination device 320 is configured to receive the post-processed picture data 327 for displaying the picture, e.g., to a user or viewer. The display device 328 may be or comprise any kind of display for representing the reconstructed picture, e.g., an integrated or external display or monitor. The displays may, e.g., comprise cathode ray tubes (CRT), liquid crystal displays (LCD), plasma displays, organic light emitting diodes (OLED) displays or any kind of other display, such as projectors, holographic displays, apparatuses to generate holograms and other such devices.

Although FIG. 1 depicts the source device 310 and the destination device 320 as separate devices, embodiments of devices may also comprise both or both functionalities, the source device 310 or corresponding functionality and the destination device 320 or corresponding functionality. In such embodiments the source device 310 or corresponding functionality and the destination device 320 or corresponding functionality may be implemented using the same hardware and/or software or by separate hardware and/or software or any combination thereof.

As will be apparent for the skilled person based on the description, the existence and (exact) split of functionalities of the different units or functionalities within the source device 310 and/or destination device 320 as shown in FIG. 1 may vary depending on the actual device and application.

In the following, a few non-limiting examples for the coding system 300, the source device 310 and/or destination device 320 will be provided.

Various electronic products, such as a smartphone, a tablet or a handheld camera with integrated display, may be seen as examples for a coding system 300. They contain a display device 328 and most of them contain an integrated camera, i.e. a picture source 312, as well. Picture data taken by the integrated camera is processed and displayed. The processing may include encoding and decoding of the picture data internally. In addition, the encoded picture data may be stored in an integrated memory.

Alternatively, these electronic products may have wired or wireless interfaces to receive picture data from external sources, such as the internet or external cameras, or to transmit the encoded picture data to external displays or storage units.

On the other hand, set-top boxes do not contain an integrated camera or a display but perform picture processing of received picture data for display on an external display device. Such a set-top box may be embodied by a chipset, for example.

Alternatively, a device similar to a set-top box may be included in a display device, such as a TV set with integrated display.

Surveillance cameras without an integrated display constitute a further example. They represent a source device with an interface for the transmission of the captured and encoded picture data to an external display device or an external storage device.

Contrary, devices such as smart glasses or 3D glasses, for instance used for AR or VR, represent a destination device 320. They receive the encoded picture data and display them.

Therefore, the source device 310 and the destination device 320 as shown in FIG. 1 are just example embodiments of the invention and embodiments of the invention are not limited to those shown in FIG. 1.

Source device 310 and destination device 320 may comprise any of a wide range of devices, including any kind of handheld or stationary devices, e.g., notebook or laptop computers, mobile phones, smart phones, tablets or tablet computers, cameras, desktop computers, set-top boxes, televisions, display devices, digital media players, video gaming consoles, video streaming devices, broadcast receiver device, or the like. For large-scale professional encoding and decoding, the source device 310 and/or the destination device 320 may additionally comprise servers and work stations, which may be included in large networks. These devices may use no or any kind of operating system.

Encoder & Encoding Method

FIG. 2 shows a schematic/conceptual block diagram of an embodiment of an encoder 100, e.g., a picture encoder 100, which comprises an input 102, a residual calculation unit 104, a transformation unit 106, a quantization unit 108, an inverse quantization unit 110, and inverse transformation unit 112, a reconstruction unit 114, a buffer 116, a loop filter 120, a decoded picture buffer (DPB) 130, a prediction unit 160, which includes an inter estimation unit 142, an inter prediction unit 144, an intra-estimation unit 152, an intra-prediction unit 154 and a mode selection unit 162, an entropy encoding unit 170, and an output 172. A video encoder 100 as shown in FIG. 2 may also be referred to as hybrid video encoder or a video encoder according to a hybrid video codec. Each unit may consist of a processor and a non-transitory memory to perform its processing steps by executing a code stored in the non-transitory memory by the processor.

For example, the residual calculation unit 104, the transformation unit 106, the quantization unit 108, and the entropy encoding unit 170 form a forward signal path of the encoder 100, whereas, for example, the inverse quantization unit 110, the inverse transformation unit 112, the reconstruction unit 114, the buffer 116, the loop filter 120, the decoded picture buffer (DPB) 130, the inter prediction unit 144, and the intra-prediction unit 154 form a backward signal path of the encoder, wherein the backward signal path of the encoder corresponds to the signal path of the decoder to provide inverse processing for identical reconstruction and prediction (see decoder 200 in FIG. 3).

The encoder is configured to receive, e.g., by input 102, a picture 101 or a picture block 103 of the picture 101, e.g., picture of a sequence of pictures forming a video or video sequence. The picture block 103 may also be referred to as current picture block or picture block to be coded, and the picture 101 as current picture or picture to be coded (in particular in video coding to distinguish the current picture from other pictures, e.g., previously encoded and/or decoded pictures of the same video sequence, i.e. the video sequence which also comprises the current picture).

Partitioning

Embodiments of the encoder 100 may comprise a partitioning unit (not depicted in FIG. 2), e.g., which may also be referred to as picture partitioning unit, configured to partition the picture 103 into a plurality of blocks, e.g., blocks like block 103, typically into a plurality of non-overlapping blocks. The partitioning unit may be configured to use the same block size for all pictures of a video sequence and the corresponding grid defining the block size, or to change the block size between pictures or subsets or groups of pictures, and partition each picture into the corresponding blocks.

Each block of the plurality of blocks may have square dimensions or more general rectangular dimensions. Blocks being picture areas with non-rectangular shapes may not appear.

Like the picture 101, the block 103 again is or can be regarded as a two-dimensional array or matrix of samples with intensity values (sample values), although of smaller dimension than the picture 101. In other words, the block 103 may comprise, e.g., one sample array (e.g., a luma array in case of a monochrome picture 101) or three sample arrays (e.g., a luma and two chroma arrays in case of a color picture 101) or any other number and/or kind of arrays depending on the color format applied. The number of samples in horizontal and vertical direction (or axis) of the block 103 define the size of block 103.

Encoder 100 as shown in FIG. 2 is configured to encode the picture 101 block by block, e.g., the encoding and prediction is performed per block 103.

Residual Calculation

The residual calculation unit 104 is configured to calculate a residual block 105 based on the picture block 103 and a prediction block 165 (further details about the prediction block 165 are provided later), e.g., by subtracting sample values of the prediction block 165 from sample values of the picture block 103, sample by sample (pixel by pixel) to obtain the residual block 105 in the sample domain.

Transformation

The transformation unit 106 is configured to apply a transformation, e.g., a spatial frequency transform or a linear spatial transform, e.g., a discrete cosine transform (DCT) or discrete sine transform (DST), on the sample values of the residual block 105 to obtain transformed coefficients 107 in a transform domain. The transformed coefficients 107 may also be referred to as transformed residual coefficients and represent the residual block 105 in the transform domain.

The transformation unit 106 may be configured to apply integer approximations of DCT/DST, such as the core transforms specified for HEVC/H.265. Compared to an orthonormal DCT transform, such integer approximations are typically scaled by a certain factor. In order to preserve the norm of the residual block which is processed by forward and inverse transforms, additional scaling factors are applied as part of the transform process. The scaling factors are typically chosen based on certain constraints like scaling factors being a power of two for shift operation, bit depth of the transformed coefficients, tradeoff between accuracy and implementation costs, etc. Specific scaling factors are, for example, specified for the inverse transform, e.g., by inverse transformation unit 212, at a decoder 200 (and the corresponding inverse transform, e.g., by inverse transformation unit 112 at an encoder 100) and corresponding scaling factors for the forward transform, e.g., by transformation unit 106, at an encoder 100 may be specified accordingly.

Quantization

The quantization unit 108 is configured to quantize the transformed coefficients 107 to obtain quantized coefficients 109, e.g., by applying scalar quantization or vector quantization. The quantized coefficients 109 may also be referred to as quantized residual coefficients 109. For example, for scalar quantization, different scaling may be applied to achieve finer or coarser quantization. Smaller quantization step sizes correspond to finer quantization, whereas larger quantization step sizes correspond to coarser quantization. The applicable quantization step size may be indicated by a quantization parameter (QP). The quantization parameter may for example be an index to a predefined set of applicable quantization step sizes. For example, small quantization parameters may correspond to fine quantization (small quantization step sizes) and large quantization parameters may correspond to coarse quantization (large quantization step sizes) or vice versa. The quantization may include division by a quantization step size and corresponding or inverse dequantization, e.g., by inverse quantization 110, may include multiplication by the quantization step size. Embodiments according to HEVC (High-Efficiency Video Coding), may be configured to use a quantization parameter to determine the quantization step size. Generally, the quantization step size may be calculated based on a quantization parameter using a fixed point approximation of an equation including division. Additional scaling factors may be introduced for quantization and dequantization to restore the norm of the residual block, which might get modified because of the scaling used in the fixed point approximation of the equation for quantization step size and quantization parameter. In one example implementation, the scaling of the inverse transform and dequantization might be combined. Alternatively, customized quantization tables may be used and signaled from an encoder to a decoder, e.g., in a bit stream. The quantization is a lossy operation, wherein the loss increases with increasing quantization step sizes.

Embodiments of the encoder 100 (or respectively of the quantization unit 108) may be configured to output the quantization settings including quantization scheme and quantization step size, e.g., by means of the corresponding quantization parameter, so that a decoder 200 may receive and apply the corresponding inverse quantization. Embodiments of the encoder 100 (or quantization unit 108) may be configured to output the quantization scheme and quantization step size, e.g., directly or entropy encoded via the entropy encoding unit 170 or any other entropy coding unit.

The inverse quantization unit 110 is configured to apply the inverse quantization of the quantization unit 108 on the quantized coefficients to obtain dequantized coefficients 111, e.g., by applying the inverse of the quantization scheme applied by the quantization unit 108 based on or using the same quantization step size as the quantization unit 108. The dequantized coefficients 111 may also be referred to as dequantized residual coefficients 111 and correspond—although typically not identical to the transformed coefficients due to the loss by quantization—to the transformed coefficients 108.

The inverse transformation unit 112 is configured to apply the inverse transformation of the transformation applied by the transformation unit 106, e.g., an inverse discrete cosine transform (DCT) or inverse discrete sine transform (DST), to obtain an inverse transformed block 113 in the sample domain. The inverse transformed block 113 may also be referred to as inverse transformed dequantized block 113 or inverse transformed residual block 113.

The reconstruction unit 114 is configured to combine the inverse transformed block 113 and the prediction block 165 to obtain a reconstructed block 115 in the sample domain, e.g., by sample wise adding the sample values of the decoded residual block 113 and the sample values of the prediction block 165.

The buffer unit 116 (or short "buffer" 116), e.g., a line buffer 116, is configured to buffer or store the reconstructed block and the respective sample values, for example for intra estimation and/or intra prediction. In further embodiments, the encoder may be configured to use unfiltered reconstructed blocks and/or the respective sample values stored in buffer unit 116 for any kind of estimation and/or prediction.

Embodiments of the encoder 100 may be configured such that, e.g., the buffer unit 116 is not only used for storing the reconstructed blocks 115 for intra estimation 152 and/or intra prediction 154 but also for the loop filter unit 120, and/or such that, e.g., the buffer unit 116 and the decoded picture buffer unit 130 form one buffer. Further embodiments may be configured to use filtered blocks 121 and/or blocks or samples from the decoded picture buffer 130 (both not shown in FIG. 2) as input or basis for intra estimation 152 and/or intra prediction 154.

The loop filter unit 120 (or short "loop filter" 120), is configured to filter the reconstructed block 115 to obtain a filtered block 121, e.g., by applying a de-blocking sample-adaptive offset (SAO) filter or other filters, e.g., sharpening or smoothing filters or collaborative filters. The filtered block 121 may also be referred to as filtered reconstructed block 121.

Embodiments of the loop filter unit 120 may comprise a filter analysis unit and the actual filter unit, wherein the filter analysis unit is configured to determine loop filter parameters for the actual filter. The filter analysis unit may be configured to apply fixed pre-determined filter parameters to the actual loop filter, adaptively select filter parameters from a set of predetermined filter parameters or adaptively calculate filter parameters for the actual loop filter.

Embodiments of the loop filter unit 120 may comprise (not shown in FIG. 2) one or a plurality of filters (such as loop filter components and/or subfilters), e.g., one or more of different kinds or types of filters, e.g., connected in series or in parallel or in any combination thereof, wherein each of the filters may comprise individually or jointly with other filters of the plurality of filters a filter analysis unit to determine the respective loop filter parameters, e.g., as described in the previous paragraph.

Embodiments of the encoder 100 (respectively loop filter unit 120) may be configured to output the loop filter parameters, e.g., directly or entropy encoded via the entropy encoding unit 170 or any other entropy coding unit, so that, e.g., a decoder 200 may receive and apply the same loop filter parameters for decoding.

The decoded picture buffer (DPB) 130 is configured to receive and store the filtered block 121. The decoded picture buffer 130 may be further configured to store other previously filtered blocks, e.g., previously reconstructed and filtered blocks 121, of the same current picture or of different pictures, e.g., previously reconstructed pictures, and may provide complete previously reconstructed, i.e. decoded, pictures (and corresponding reference blocks and samples) and/or a partially reconstructed current picture (and corresponding reference blocks and samples), for example for inter estimation and/or inter prediction.

Further embodiments of the invention may also be configured to use the previously filtered blocks and corresponding filtered sample values of the decoded picture buffer 130 for any kind of estimation or prediction, e.g., intra estimation and prediction as well as inter estimation and prediction.

The prediction unit 160, also referred to as block prediction unit 160, is configured to receive or obtain the picture block 103 (current picture block 103 of the current picture 101) and decoded or at least reconstructed picture data, e.g., reference samples of the same (current) picture from buffer 116 and/or decoded picture data 231 from one or a plurality of previously decoded pictures from decoded picture buffer 130, and to process such data for prediction, i.e. to provide a prediction block 165, which may be an inter-predicted block 145 or an intra-predicted block 155.

Mode selection unit 162 may be configured to select a prediction mode (e.g., an intra or inter prediction mode) and/or a corresponding prediction block 145 or 155 to be used as prediction block 165 for the calculation of the residual block 105 and for the reconstruction of the reconstructed block 115.

Embodiments of the mode selection unit 162 may be configured to select the prediction mode (e.g., from those supported by prediction unit 160), which provides the best match or in other words the minimum residual (minimum residual means better compression for transmission or storage), or a minimum signaling overhead (minimum signaling overhead means better compression for transmission or storage), or which considers or balances both. The mode selection unit 162 may be configured to determine the prediction mode based on rate distortion optimization (RDO), i.e. select the prediction mode which provides a minimum rate distortion optimization or which associated rate distortion at least fulfills a prediction mode selection criterion.

In the following, the prediction processing (e.g., prediction unit 160) and mode selection (e.g., by mode selection unit 162) performed by an example encoder 100 will be explained in more detail.

As described above, encoder 100 is configured to determine or select the best or an optimum prediction mode from a set of (pre-determined) prediction modes. The set of prediction modes may comprise, e.g., intra-prediction modes and/or inter-prediction modes.

The set of intra-prediction modes may comprise 32 different intra-prediction modes, e.g., non-directional modes like DC (or mean) mode and planar mode, or directional modes, e.g., as defined in H.264, or may comprise 65 different intra-prediction modes, e.g., non-directional modes like DC (or mean) mode and planar mode, or directional modes, e.g., as defined in H.265.

The set of (or possible) inter-prediction modes depend on the available reference pictures (i.e. previous at least partially decoded pictures, e.g., stored in DPB 230) and other inter-prediction parameters, e.g., whether the whole reference picture or only a part, e.g., a search window area around the area of the current block, of the reference picture is used for searching for a best matching reference block, and/or e.g., whether pixel interpolation is applied, e.g., half/semi-pel and/or quarter-pel interpolation, or not.

Additional to the above prediction modes, skip mode and/or direct mode may be applied.

The prediction unit 160 may be further configured to partition the block 103 into smaller block partitions or sub-blocks, e.g., iteratively using quad-tree-partitioning (QT), binary partitioning (BT) or triple-tree-partitioning (TT) or any combination thereof, and to perform, e.g., the prediction for each of the block partitions or sub-blocks, wherein the mode selection comprises the selection of the tree-structure of the partitioned block 103 and the prediction modes applied to each of the block partitions or sub-blocks.

The inter estimation unit 142, also referred to as inter picture estimation unit 142, is configured to receive or obtain the picture block 103 (current picture block 103 of the current picture 101) and a decoded picture 231, or at least one or a plurality of previously reconstructed blocks, e.g., reconstructed blocks of one or a plurality of other/different previously decoded pictures 231, for inter estimation (or "inter picture estimation"). E.g., a video sequence may comprise the current picture and the previously decoded pictures 231, or in other words, the current picture and the previously decoded pictures 231 may be part of or form a sequence of pictures forming a video sequence.

The encoder 100 may, e.g., be configured to select (obtain/determine) a reference block from a plurality of reference blocks of the same or different pictures of the plurality of other pictures and provide a reference picture (or reference picture index, . . . ) and/or an offset (spatial offset) between the position (x, y coordinates) of the reference block and the position of the current block as inter estimation parameters 143 to the inter prediction unit 144. This offset is also called motion vector (MV). The inter estimation is also referred to as motion estimation (ME) and the inter prediction also motion prediction (MP).

The inter prediction unit 144 is configured to obtain, e.g., receive, an inter prediction parameter 143 and to perform inter prediction based on or using the inter prediction parameter 143 to obtain an inter prediction block 145.

Although FIG. 2 shows two distinct units (or steps) for the inter-coding, namely inter estimation 142 and inter prediction 152, both functionalities may be performed as one (inter estimation typically requires/comprises calculating an/the inter prediction block, i.e. the or a "kind of" inter prediction 154), e.g., by testing all possible or a predetermined subset of possible inter prediction modes iteratively while storing the currently best inter prediction mode and respective inter prediction block, and using the currently best inter prediction mode and respective inter prediction block as the (final) inter prediction parameter 143 and inter prediction block 145 without performing another time the inter prediction 144.

The intra estimation unit 152 is configured to obtain, e.g., receive, the picture block 103 (current picture block) and one or a plurality of previously reconstructed blocks, e.g., reconstructed neighbor blocks, of the same picture for intra estimation. The encoder 100 may, e.g., be configured to select (obtain/determine) an intra prediction mode from a plurality of intra prediction modes and provide it as intra estimation parameter 153 to the intra prediction unit 154.

Embodiments of the encoder 100 may be configured to select the intra-prediction mode based on an optimization criterion, e.g., minimum residual (e.g., the intra-prediction mode providing the prediction block 155 most similar to the current picture block 103) or minimum rate distortion.

The intra prediction unit 154 is configured to determine based on the intra prediction parameter 153, e.g., the selected intra prediction mode 153, the intra prediction block 155.

Although FIG. 2 shows two distinct units (or steps) for the intra-coding, namely intra estimation 152 and intra prediction 154, both functionalities may be performed as one (intra estimation typically requires/comprises calculating the intra prediction block, i.e. the or a "kind of" intra prediction 154), e.g., by testing all possible or a predetermined subset of possible intra-prediction modes iteratively while storing the currently best intra prediction mode and respective intra prediction block, and using the currently best intra prediction mode and respective intra prediction block as the (final) intra prediction parameter 153 and intra prediction block 155 without performing another time the intra prediction 154.

The entropy encoding unit 170 is configured to apply an entropy encoding algorithm or scheme (e.g., a variable length coding (VLC) scheme, an context adaptive VLC scheme (CALVC), an arithmetic coding scheme, a context adaptive binary arithmetic coding (CABAC)) on the quantized residual coefficients 109, inter prediction parameters 143, intra prediction parameter 153, and/or loop filter parameters, individually or jointly (or not at all) to obtain encoded picture data 171 which can be output by the output 172, e.g., in the form of an encoded bit stream 171.

Decoder

FIG. 3 shows an exemplary video decoder 200 configured to receive encoded picture data (e.g., encoded bit stream) 171, e.g., encoded by encoder 100, to obtain a decoded picture 231.

The decoder 200 comprises an input 202, an entropy decoding unit 204, an inverse quantization unit 210, an inverse transformation unit 212, a reconstruction unit 214, a buffer 216, a loop filter 220, a decoded picture buffer 230, a prediction unit 260, which includes an inter prediction unit 244, an intra prediction unit 254, and a mode selection unit 260, and an output 232.

The entropy decoding unit 204 is configured to perform entropy decoding to the encoded picture data 171 to obtain, e.g., quantized coefficients 209 and/or decoded coding parameters (not shown in FIG. 3), e.g., (decoded) any or all of inter prediction parameters 143, intra prediction parameter 153, and/or loop filter parameters.

In embodiments of the decoder 200, the inverse quantization unit 210, the inverse transformation unit 212, the reconstruction unit 214, the buffer 216, the loop filter 220, the decoded picture buffer 230, the prediction unit 260 and the mode selection unit 260 are configured to perform the inverse processing of the encoder 100 (and the respective functional units) to decode the encoded picture data 171.

In particular, the inverse quantization unit 210 may be identical in function to the inverse quantization unit 110, the inverse transformation unit 212 may be identical in function to the inverse transformation unit 112, the reconstruction unit 214 may be identical in function reconstruction unit 114, the buffer 216 may be identical in function to the buffer 116, the loop filter 220 may be identical in function to the loop filter 220 (with regard to the actual loop filter as the loop filter 220 typically does not comprise a filter analysis unit to determine the filter parameters based on the original image 101 or block 103 but receives (explicitly or implicitly) or obtains the filter parameters used for encoding, e.g., from entropy decoding unit 204), and the decoded picture buffer 230 may be identical in function to the decoded picture buffer 130.

The prediction unit 260 may comprise an inter prediction unit 244 and an intra prediction unit 254, wherein the inter prediction unit 244 may be identical in function to the inter prediction unit 144, and the intra prediction unit 254 may be identical in function to the intra prediction unit 154. The prediction unit 260 and the mode selection unit 262 are typically configured to perform the block prediction and/or obtain the predicted block 265 from the encoded data 171 only (without any further information about the original image 101) and to receive or obtain (explicitly or implicitly) the prediction parameters 143 or 153 and/or the information about the selected prediction mode, e.g., from the entropy decoding unit 204.

The decoder 200 is configured to output the decoded picture 231, e.g., via output 232, for presentation or viewing to a user.

Referring back to FIG. 1, the decoded picture 231 output from the decoder 200 may be post-processed in the post-processor 326. The resulting post-processed picture 327 may be transferred to an internal or external display device 328 and displayed.

Details of Embodiments

The invention restricts the values that can be assumed by the filter coefficients of an adaptive multiplicative filter in such a way that the multiplication operation is simplified. The filtering of a set of signal samples of an image uses a filter with adaptive multiplier coefficients, where the multiplier coefficients are represented by integer numbers. Given that the highest value of the absolute value of a coefficient C is N, the binary representation of N requires L=ceil(log$_2$(N)) binary digits. In other words, with L binary digits, absolute coefficient values from zero (L "zeroes") to $2^L-1$ (L "ones") can be expressed (the sign of the coefficient is represented by a separate sign bit not discussed here). According to the particular approach of the invention, this set of values is restricted so that any value that can be assumed by the coefficient C includes at most a number P<L of "ones" ("1") in the binary representation. For instance, the case of all "ones" (L "ones") is excluded.

As will be shown below, the smaller the number P of allowed "ones" is, the better the efficiency gain and the performance of the filtering operation. For instance, the best efficiency gain can be achieved if any value that can be assumed by the coefficient C includes only up to a single "1", i.e. at most one "1".

In the following, particular embodiments of implementation of the invention will be described in detail.

It is noted that the exemplary values of parameters given below are for illustrative purposes only, and the skilled person is aware that they may be replaced within any other possible values that are within the scope of the appended claims.

Generally, the filter coefficients are implemented using finite precision. A filter coefficient is represented using L bits, together with an optional sign bit. The amount of bits L depends on the maximum absolute value of the coefficient. Specifically, given that the highest value of the absolute value of a coefficient C is N, the binary representation of N requires L=ceil(log$_2$(N)) binary digits.

The ceil(x) function, also denoted as ⌈x⌉ or ceiling(x), maps x to the least integer greater than or equal to x.

According to a first exemplary embodiment of the invention, at most one out of L bits (i.e. excluding the sign bit) of a filter coefficient can be "one" ("1") at the same time. Other possibilities are not allowed.

For example:

Assume L=6, and one bit (the leftmost bit) is used to indicate the sign of the coefficient.

The following filter coefficients are, for instance, allowed: 0 (0000000), 1 (0000001), −1 (1000001), 2 (0000010), −2 (1000010), 4 (0000100), −4 (1000100), 8 (0001000), −8 (1001000), 16 (0010000) . . . , −32 (1100000).

The following filter coefficients are, for instance, not allowed: 3 (0000011), −15 (1001111), 31 (0011111) . . . .

In this case, a benefit is achieved since the restriction allows that the multiplication can be implemented as a single bit shifting operation.

The bit shifting operation can be mathematically represented as: $f(X,M)=X*2^M$ where M is an integer greater than or equal to 0. In accordance with a generalization of the above embodiment, at most M out of L bits of the filter coefficient can be "1" at the same time. Other possibilities are not allowed.

For example:

Assume L=6, M=2, and one bit is used to indicate the sign of the coefficient.

The following filter coefficients, for instance, are allowed: 0 (0000000), 3 (0000011), 9 (0001001), −4 (1000100), −9 (1001001), 18 (0010010), 33 (0100001) . . . .

The following filter coefficients, for instance, are not allowed: 7 (0000111), −19 (1010011), 31 (0011111) . . . .

In this case, the restriction allows that the multiplication can be implemented by two bit shifting and one addition operations.

In the more general case outlined above, with a general M<L, a benefit is achieved since the restriction allows the multiplication to be achieved by M bit shifting and M−1 addition operations.

In the examples given above, it is assumed that the restricted set of absolute values is applied to all filter coefficients of a multiplication of adaptive filter.

In the following, a more complex exemplary embodiment will be described with reference to FIG. 7, wherein a restriction according to the invention is applied, but not to all filter coefficients of the filter under consideration.

In the example, in a first step, the coefficients are grouped into two groups. In the drawing, the first group corresponds to the coefficient positions indicated by open circles in the central portion of the filter and the second group corresponds to the coefficient positions indicated by filled black circles in the drawing, in the peripheral portion of the filter.

The filter coefficients in the first group can assume any value in a predetermined range. In the illustrated example, it is assumed that the range corresponds to a set "S1", wherein S1=[−511, . . . , 511]. This corresponds to an overall number of bits (excluding the sign bit) of L=9.

Figure 5:
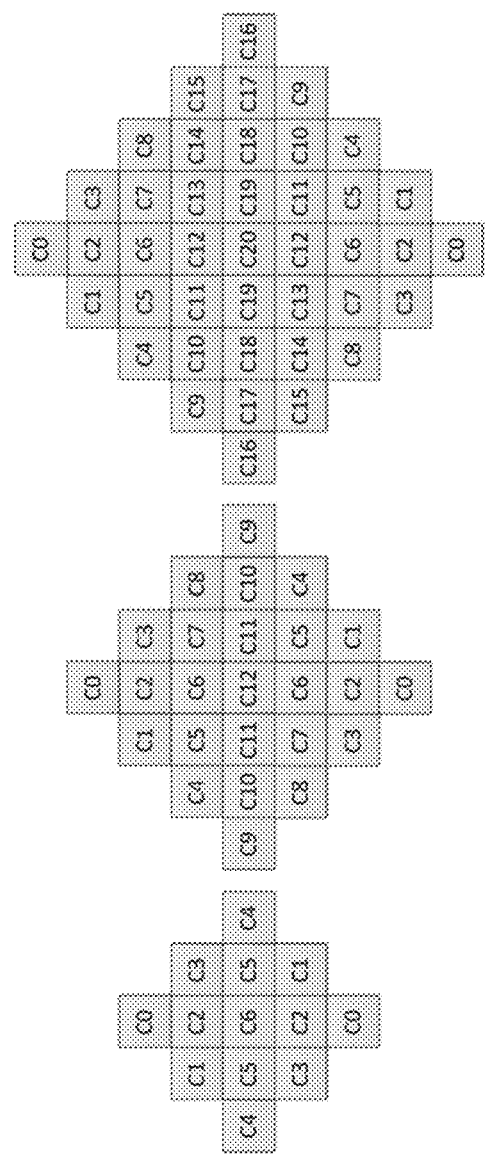
FIG. 5 shows examples of typical filter shapes for adaptive filters to which the invention can be applied.

The filter coefficients in the second group can assume any value in a set "S2", wherein S2" is a subset of S1. More specifically, in an example, the set S2 is defined as S2=[−32, −16, −8, −4, −2, −1, 0, 1, 2, 4, 8, 16, 32]. Accordingly, the allowed values in the set S2 are restricted to those that can be represented with a single "1" in the binary representation. Moreover, the maximum absolute allowed value is restricted to 32, i.e. it is further assumed that the number L is restricted to L=6. Generally, it is noted that the number L can be set separately and differently for each group. Moreover, the particular grouping and definition of the sets of the allowed values can change from image to image (frame to frame). Alternatively, the grouping and the definition of the sets might be different for the different filter shapes (e.g., 5×5 diamond, 7×7 diamond, 9×9 diamond as described in FIG. 5). Alternatively, the grouping and definitions might be predefined.

In this example, the benefit is that instead of 9-bit multiplication, 1 bit shifting is employed for the set S2.

Respective data must be included in the bit stream at the encoder and signaled to the decoder so that the filter coefficients can be correctly determined at the decoder as well. Of course, applying a restricted set of allowed coefficient values leads to a reduction of the signaling overhead and thus to a more efficient coding since less bits are necessary for representing the coefficients to be signaled in the bit stream.

More specifically the value of the filter coefficients that are applied by the encoder needs to be coded and transmitted to the decoder. On the encoder side, the values of the filter coefficients are converted into binary codewords (from filter value to codeword) via a mapping table or a mapping function. The same mapping operation must be applied in the decoder (from codeword to filter coefficient value) in order to interpret the filter coefficients correctly.

The mapping function or table might be different for S1 and S2. Example mapping operations are given below for the filter coefficient sets S1 and S2.

In the example below S1 is given by {0, 1, . . . , 511} and S2 is given by {0, 2, 4, 8, 16, 32}(the absolute values are considered only).

| S1 | | S2 | |
|---|---|---|---|
| Filter coefficient value | codeword | Filter coefficient value | codeword |
| 0 | 000000000 | 0 | 000 |
| 1 | 000000001 | 2 | 001 |
| 2 | 000000010 | 4 | 010 |
| 3 | 000000011 | 8 | 011 |
| 4 | 000000100 | 16 | 100 |
| 5 | 000000101 | 32 | 101 |
| 6 | 000000110 | | |
| . . . | | | |

The forward (in the encoder) and backward (in the decoder) mapping operations need to be employed in the encoder and decoder so that the decoder can correctly interpret the filter coefficient values. In the above example the filter coefficient mapping operation is different for S2 and S1, since the number of distinct values in S2 is much lower and it is wasteful to represent the S2 filter coefficients using the mapping of S1. Hence, the invention leads to a reduction of the signaling overhead and thus to a more efficient coding, since less bits are necessary for representing the coefficients to be signaled in the bit stream.

Figure 8B:
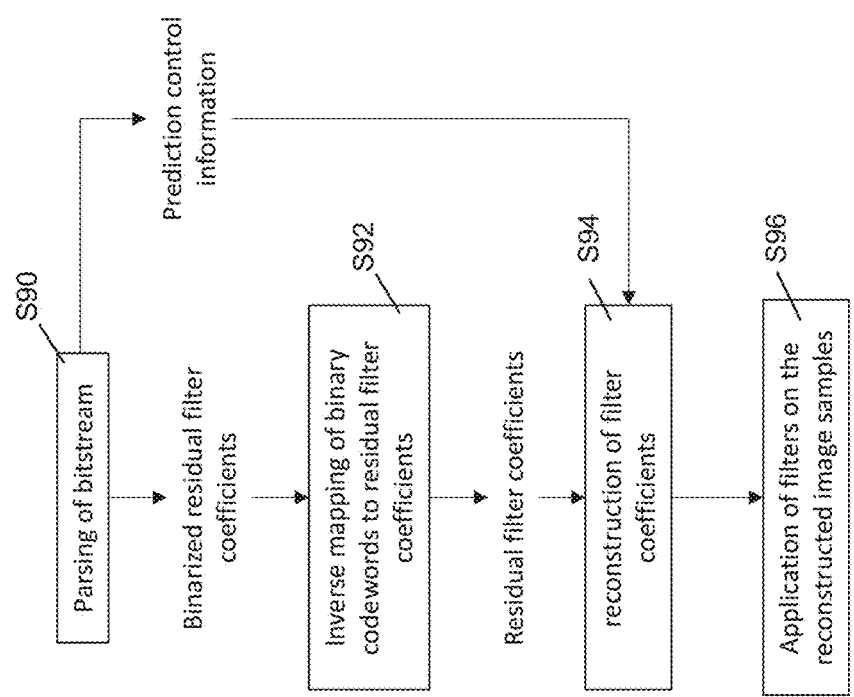
FIG. 8B illustrates an exemplary decoder side processing for decoding and reconstructing filter coefficients.

In the following, a general overview of the signaling of filter coefficients will be given with reference to FIG. 8. FIG. 8 A illustrates the processing on the encoder side and FIG. 8B illustrates the processing on the decoder side.

In the encoder, the filter coefficients to be applied on the reconstructed samples are determined according to the allowed coefficient values as determined by the particular approach of the invention (step S80).

The determined filter coefficients are used to filter the reconstructed image samples (step S82). According to the invention, the filter coefficients that are applied on the reconstructed image samples need to obey the rules as set forth according to the invention.

The following step of prediction of filter coefficients (step S84) is optional. Filter coefficient prediction can be applied optionally in order to reduce the information to be signaled to the decoder. Possible prediction methods are prediction using predefined filter predictors and prediction from previously signaled filter coefficients. However, the prediction methods are not limited to these given here by example, and any suitable prediction method a skilled person is aware of can be applied.

In the following step (S86) a mapping of the residual coefficients to binary codewords is performed. Since the foregoing prediction step S84 is optional, it is noted that alternatively the mapping is applied directly to the filter coefficients determined in step S80.

More specifically, each integer valued filter coefficient (filter coefficient residual) is converted to a binary codeword before being included into the bit stream. There are as many codewords as possible filter coefficient values (filter coefficient residual values). The codeword to value mapping (which is a one-to-one mapping) can be a fixed mapping or can change depending on signaled side information.

In final step S88, the binarized (optionally residual) filter coefficients, i.e. the codewords to which they were mapped, are included in the bit stream. In case prediction is performed in step S84, it is further necessary to generate a prediction control information and to include said prediction control information in the bit stream, in order to signal the decoder the necessary information about the prediction processing, so as to be able to perform the reconstruction.

Generally, the operations applied in the encoder are applied in the decoder in reverse order. This will be explained in more detail below with reference to FIG. 8B.

In initial step S90, a received bit stream is parsed. The resulting binarized filter coefficients (i.e. transmitted codewords) are optionally representing residual filter coefficients (if prediction was applied at the encoder side). This is indicated by additionally obtaining prediction control information from the parsed bit stream.

In any case, the binary codewords are mapped by an inverse mapping procedure (as compared to the encoder) to the filter coefficients (or residual filter coefficients) in step S92.

As a result, the filter coefficients are determined (reconstructed) on the decoder side (step S94). If prediction was applied, so that the filter coefficients resulting from step S92 are residual filter coefficients, the reconstruction additionally includes performing the prediction as indicated by the prediction control information and adding the prediction result to the residual filter coefficients, in order to obtain the reconstructed filter coefficients.

After the filter coefficients are reconstructed (if applicable, by combining the predictor information and filter residuals), they are applied on the reconstructed image samples (step S96).

According to the invention, the filter coefficients that are applied on the reconstructed image samples need to obey the rules defined according to the invention.

Accordingly, if a filter coefficient resulting from the reconstruction (in particular: from combining prediction and residual results) does not have an allowed filter coefficient value according to the rules of the invention (a filter coefficient value that is not among the set of allowed values), the reconstruction process of filter coefficients further performs a rounding operation. Specifically, the rounding operation may convert the input filter coefficient value to the nearest allowed coefficient value.

If the filter coefficient prediction is applied, the filter coefficients to be applied on the reconstructed image samples for the purpose of filtering are obtained by adding the prediction result ("predictor") and the residual filter coefficients (as explained in the previous paragraphs from the encoder and decoder perspectives). Obviously it is possible that the residual filter coefficients might be non-existing (equal to 0) especially if the prediction is close to perfect (the filter coefficients to be predicted are very similar to the predictor). In this case according to the invention one of the following 2 options apply:

1. The coefficient values obtained by prediction need to obey the rules defined according to the invention. For example, in the case of prediction from predefined filters, the filter coefficients of predefined filters need to obey the rules defined according to the invention.

2. The filter coefficients that are obtained after prediction need to be rounded to the nearest allowed coefficient value.

It is further noted that the division into a number of two groups has been explained here just for simplicity, but more than two groups are also possible, wherein for at least one group the set of allowable values is determined according to the invention, i.e. includes only a limited number of "ones" within a predetermined overall number of binary digits.

Figure 9:
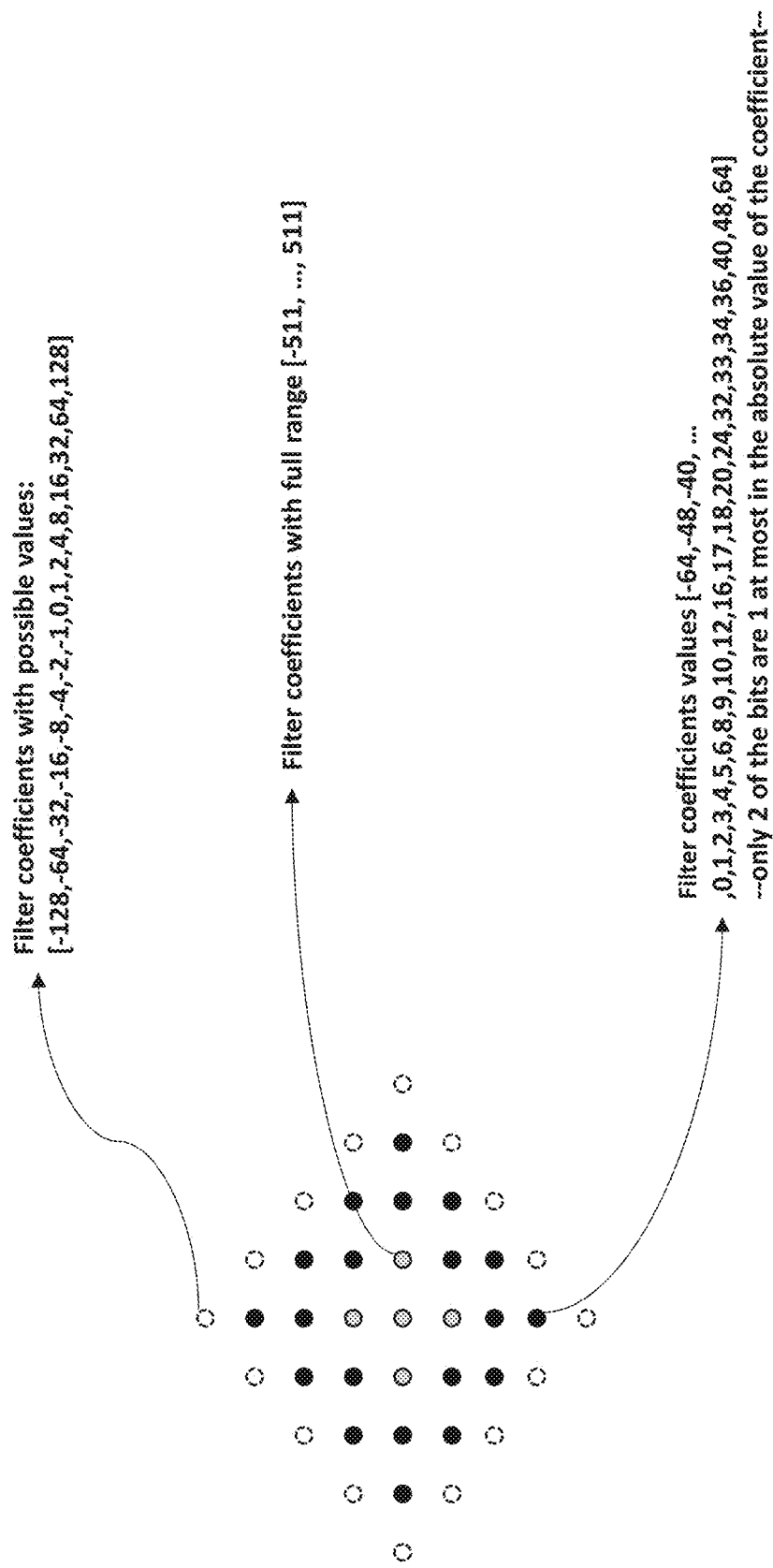
FIG. 9 illustrates a particular implementation example of another embodiment of the invention.

For instance, FIG. 9 illustrates a case wherein the coefficients of the filter are grouped into three groups.

A first group of coefficients positioned close to the center of the filter kernel has allowed filter coefficient values in the set S1=[−511, . . . , 511].

A second group of filter coefficients, located at the periphery of the kernel and indicated by broken circles, allows the filter coefficient values to be within a modified restricted set S2, wherein S2 here is S2=[−128, −64, −32, −16, −8, −4, −2, −1, 0, 1, 2, 4, 8, 16, 32, 64, 128]. This is the set of all coefficient values that can be represented with L=8 binary digits, with only a single "one".

A third group of filter coefficients, located in-between the first and the second groups, and indicated by filled circles, allows the filter coefficient values to be within another restricted set S3, wherein S3=[−64, −48, −40, . . . , 0, 1, 2, 3, 4, 5, 6, 8, 9, 10, 12, 16, 17, 18, 20, 24, 32, 33, 34, 36, 40, 48, 64].

In other words, the set S3 is the set of all coefficients that can be represented with L=7 binary digits, wherein at most two of the bits are "one" in the absolute value of the coefficient, and the additional restriction is applied that the maximum absolute value is set to 64. (Otherwise, for instance, also the absolute value 96 should be allowed, since it can be expressed with two leading "ones" in 7 binary digits.)

In the following, the particular benefit of the invention will be described by means of another exemplary embodiment illustrated in FIG. 10.

Figure 7:
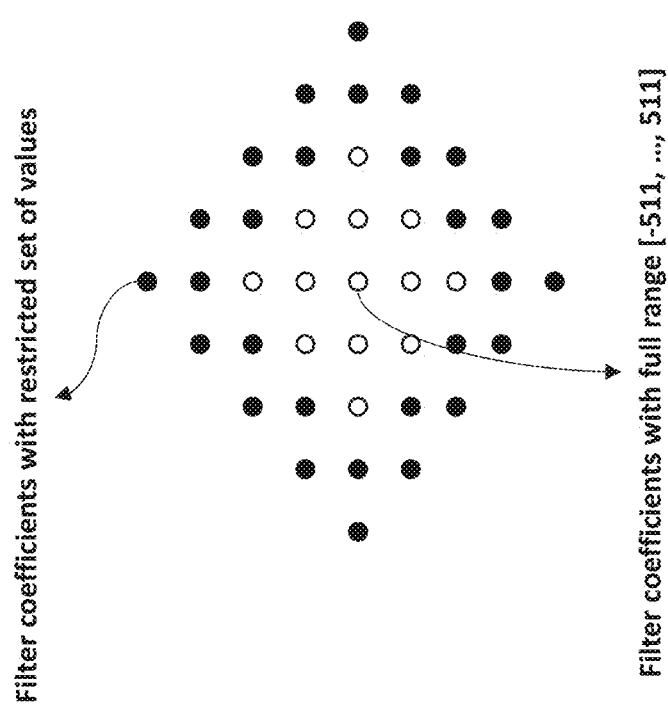
FIG. 7 illustrates a particular implementation example of an embodiment of the invention.
Figure 8A:
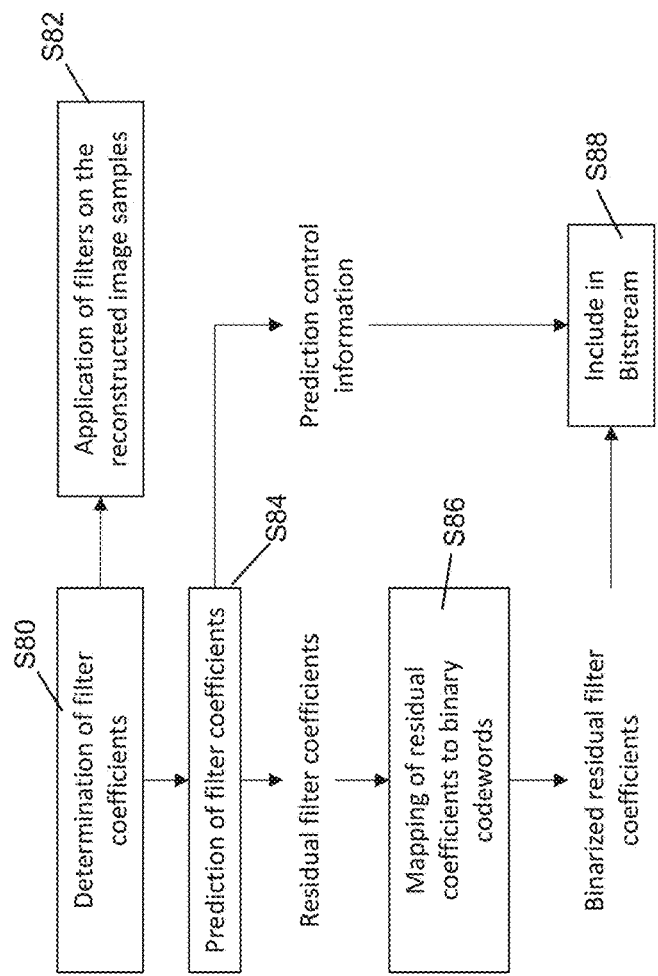
FIG. 8A illustrates an exemplary encoder side processing for encoding and signaling of filter coefficients.
Figures 10, 11:
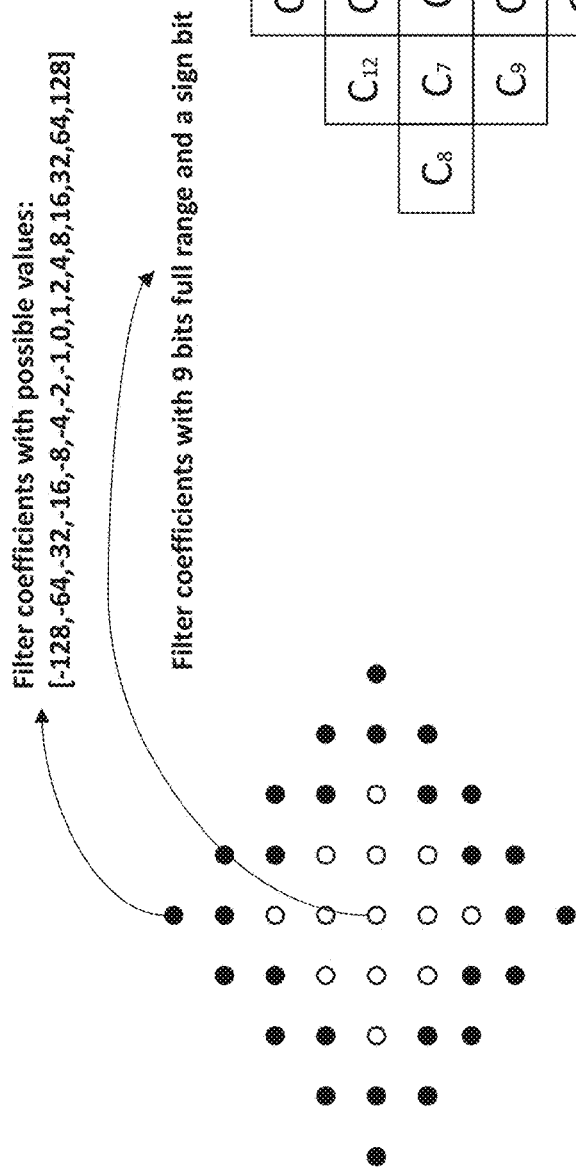
FIG. 10 illustrates a particular implementation example of still another embodiment of the invention and serves for an illustration of the benefit achieved by means of the invention.
FIG. 11 illustrates a further example of a filter kernel to which the invention can be applied.

In the example of FIG. 10, the grouping is performed in the same manner as in FIG. 7.

The filter coefficients in the first group can assume any values with nine bits full range and a sign bit, i.e. the above-mentioned set S1=[−511, 511].

The filter coefficients in the second group may assume a restricted set of values S2, wherein S2 here is S2=[−128, −64, −32, −16, −8, −4, −2, −1, 0, 1, 2, 4, 8, 16, 32, 64, 128]. This corresponds to those values that can be represented with a single "1" in the binary representation. Moreover, the maximum absolute allowed value is restricted to 128, i.e. it is further assumed that the number L is restricted to L=8.

Figure 4:
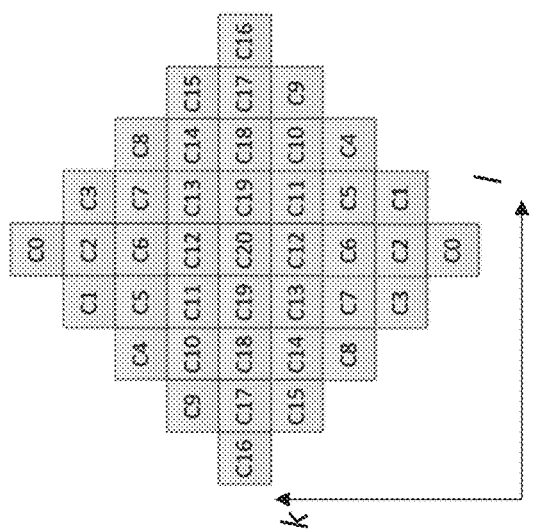
FIG. 4 shows an example of a filter kernel to which the invention can be applied.
Figure 6:
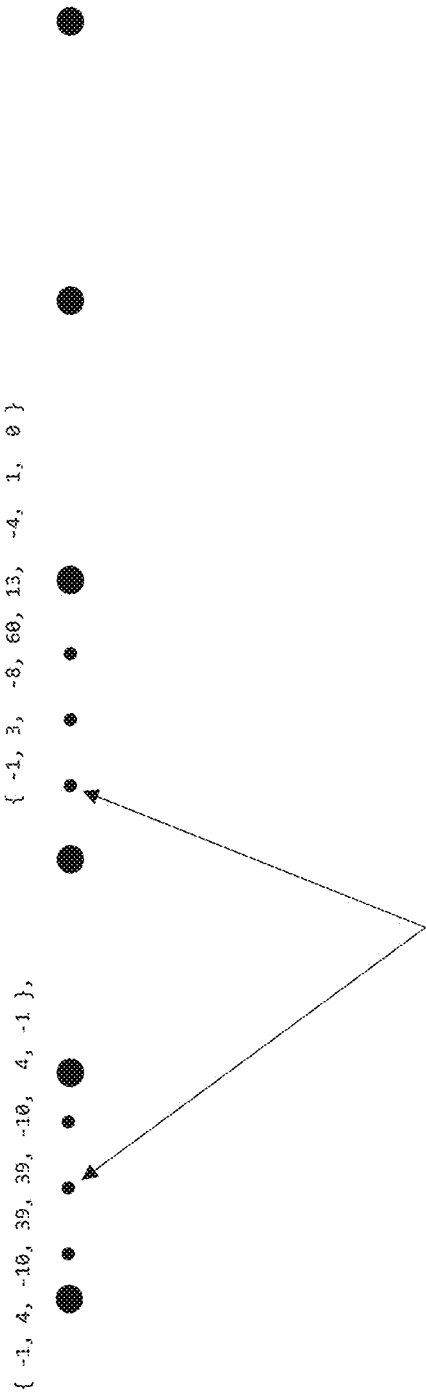
FIG. 6 illustrates an example of multiple fixed filters to be applied in interpolation filtering, as a comparative example.

In other words, the filter size corresponds to that which was shown in FIG. 4, i.e. a 9×9 diamond shaped filter. As was indicated in the background section, conventionally required 41 multiplications with 9-bit filter coefficients are required. Since one multiplication is equivalent to 8 binary additions, as mentioned in the background section, the number of additional operations per pixel is 48*8=328 addition operations.

According to the invention, the peripheral 28 coefficients (i.e. those in the second group) can be implemented as a single bit shift operation. The implementation of the bit-shift operation is of very minor complexity in hardware and can thus be omitted in the calculation.

Thirteen multiplication operations with 9-bit coefficients equate to 13*8=104 additions per pixel. The number of operations per pixel is reduced by 68%.

The numbers above are rough estimations and the exact value of reduction in complexity depends on the actual implementation.

In the following, an additional benefit of implementations using at least two coefficient groups is explained.

According to the invention, not all of the filter coefficients are coarsely quantized, and the filter coefficients in the first group have finer quantization.

Normally, coarse quantization of filter coefficients causes the coding loss. However, having the first group of filter coefficients allowed to assume a large set of values can be used to compensate for the coding loss by the encoder.

A possible encoder implementation is as follows. In the following description, the filter coefficient labels used are those as indicated in FIG. 11, which may differ from the labels previously used in connection with other drawings:

Step 1: Derive all of the filter coefficients ($C_0, \ldots, C_{20}$) using the least squares method by assuming no restriction on the coefficient values.

Step 2: Impose the restriction by rounding the coefficients ($C_7, \ldots, C_{20}$) to the closest allowed value.

This step introduces quantization noise in filter coefficients and thus reduces the coding gain.

Step 3: Re-estimate the freely selectable filter coefficients ($C_0, \ldots, C_6$) in order to compensate for the quantization errors. In this third step most of the coding loss that is introduced in step 2 can be recovered.

In more detail:

In the first step, the equation given below is solved for the 41 tap filter (with 21 unique coefficients):

$$\begin{bmatrix} X_{0,0} & X_{0,1} & \cdots & X_{0,20} \\ \vdots & \ddots & & \vdots \\ X_{19,0} & X_{19,1} & & X_{19,20} \\ & & \cdots & \\ X_{20,0} & X_{20,1} & & X_{20,20} \end{bmatrix} \begin{bmatrix} C_0 \\ \vdots \\ C_{19} \\ C_{20} \end{bmatrix} = \begin{bmatrix} P_0 \\ \vdots \\ P_{19} \\ P_{20} \end{bmatrix}$$

The equation above is called the least squares equation and is used to find the filter coefficients $C_x$ in the encoder.

The $X_{x,y}$ term is the expected value of $R(i+k,j+l)*R(i+m,j+n)$, the correlation between the 2 reconstructed samples before filtering. The indices k, l, m and n are selected according to the shape of the filter to be applied.

The term $P_x$ denotes the expected value of $R(i+k,j+l)*O(i,j)$.

In the second step, for filter coefficients $C_7$ to $C_{20}$, the closest approximate coefficients are found that satisfy the restrictions:

$$f\left(\begin{bmatrix} C_7 \\ \vdots \\ C_{19} \\ C_{20} \end{bmatrix}\right) = \begin{bmatrix} C'_7 \\ \vdots \\ C'_{19} \\ C'_{20} \end{bmatrix}$$

The coefficients $C_7'$ to $C_{20}'$ obey the rules specified by the invention. Please note that the function f( ) described above introduces quantization noise to the filter coefficients $C_7$ to $C_{20}$ that were previously obtained by solving the least squares equation.

The quantization noise introduced in the second step is expected to reduce the performance of filtering operation. The performance of filtering is usually measured by a metric such as PSNR (Peak signal-to-noise ratio), hence after step 2, the PSNR of the filtered image will be reduced.

In the third step, the equation below is solved for a 13 tap filter (with 7 unique coefficients):

$$\begin{bmatrix} X_{0,0} & X_{0,1} & \cdots & X_{0,6} \\ \vdots & \ddots & & \vdots \\ X_{5,0} & X_{5,1} & & X_{5,6} \\ & & \cdots & \\ X_{6,0} & X_{6,1} & & X_{6,6} \end{bmatrix} \begin{bmatrix} C_0 \\ \vdots \\ C_5 \\ C_6 \end{bmatrix} = \begin{bmatrix} P_0 - C'_7 * X_{0,7} - \cdots - C'_{20} * X_{0,20} \\ \vdots \\ P_5 - C'_7 * X_{5,7} - \cdots - C'_{20} * X_{5,20} \\ P_6 - C'_7 * X_{6,7} - \cdots - C'_{20} * X_{6,20} \end{bmatrix}$$

In the third step the filtering coefficients $C_0$ to $C_7$ are computed again taking into account the quantization noise introduced in the second step. The third step advantageously reduces the reduction in filtering performance that is caused by application of step 2.

It is noted that in general the application of filtering operation with adaptive multiplicative filter coefficients is not limited to reconstructed image samples. As described in FIGS. 2 and 3, the reconstructed block usually corresponds to the image block that is obtained after the combination of inverse transformed block and prediction block. As it is apparent to the person skilled in art, the filtering operation with adaptive filter coefficients can also be applied at the other steps of the encoding and decoding operations, e.g., to prediction block (265, 165), inverse transformed block (213, 113) quantized coefficients (209, 109), de-quantized coefficients (111, 211) or decoded picture (231). In this case the invention applies to the filter coefficients of filtering operation.

In summary, the invention relates to an improved apparatus and method for filtering reconstructed images, in particular, video images, with adaptive multiplicative filters. The efficiency of the filtering operation is increased by restricting the allowable values of the filter coefficients to those that have only a limited number of "ones" in the binary representation.

Note that this specification provides explanations for pictures (frames), but fields substitute as pictures in the case of an interlace picture signal.

Although embodiments of the invention have been primarily described based on video coding, it should be noted that embodiments of the encoder 100 and decoder 200 (and correspondingly the system 300) may also be configured for still picture processing or coding, i.e. the processing or coding of an individual picture independent of any preceding or consecutive picture as in video coding. In general, only inter-estimation 142, inter-prediction 144, 242 are not available in case the picture processing coding is limited to a single picture 101. Most if not all other functionalities (also referred to as tools or technologies) of the video encoder 100 and video decoder 200 may equally be used for still pictures, e.g., partitioning, transformation (scaling) 106, quantization 108, inverse quantization 110, inverse transformation 112, intra-estimation 142, intra-prediction 154, 254 and/or loop filtering 120, 220, and entropy coding 170 and entropy decoding 204.

Wherever embodiments and the description refer to the term "memory", the term "memory" shall be understood and/or shall comprise a magnetic disk, an optical disc, a solid state drive (SSD), a read-only memory (Read-Only Memory, ROM), a random access memory (Random Access Memory, RAM), a USB flash drive, or any other suitable kind of memory, unless explicitly stated otherwise.

Wherever embodiments and the description refer to the term "network", the term "network" shall be understood and/or shall comprise any kind of wireless or wired network, such as Local Area Network (LAN), Wireless LAN (WLAN) Wide Area Network (WAN), an Ethernet, the Internet, mobile networks etc., unless explicitly stated otherwise.

The person skilled in the art will understand that the "blocks" ("units" or "modules") of the various figures (method and apparatus) represent or describe functionalities of embodiments of the invention (rather than necessarily individual "units" in hardware or software) and thus describe equally functions or features of apparatus embodiments as well as method embodiments (unit=step).

The terminology of "units" is merely used for illustrative purposes of the functionality of embodiments of the encoder/decoder and are not intended to limit the disclosure.

In the several embodiments provided in the present application, it should be understood that the disclosed system, apparatus, and method may be implemented in other manners. For example, the described apparatus embodiment is merely exemplary. For example, the unit division is merely logical function division and may be another division in an actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the invention may be integrated into one processing unit, or each of the units may exist alone physically, or two or more units are integrated into one unit.

Embodiments of the invention may further comprise an apparatus, e.g., encoder and/or decoder, which comprises a processing circuitry configured to perform any one of the methods and/or processes described herein.

Embodiments of the encoder 100 and/or decoder 200 may be implemented as hardware, firmware, software or any combination thereof. For example, the functionality of the encoder/encoding or decoder/decoding may be performed by a processing circuitry with or without firmware or software, e.g., a processor, a microcontroller, a digital signal processor (DSP), a field programmable gate array (FPGA), an application-specific integrated circuit (ASIC), or the like.

The functionality of the encoder 100 (and corresponding encoding method 100) and/or decoder 200 (and corresponding decoding method 200) may be implemented by program instructions stored on a computer readable medium. The program instructions, when executed, cause a processing circuitry, computer, processor or the like, to perform the steps of the encoding and/or decoding methods. The computer readable medium can be any medium, including non-transitory storage media, on which the program is stored such as a Blu ray disc, DVD, CD, USB (flash) drive, hard disc, server storage available via a network, etc.

An embodiment of the invention comprises or is a computer program comprising program code for performing any one of the methods described herein, when executed on a computer.

An embodiment of the invention comprises or is a computer readable medium comprising a program code that, when executed by a processor, causes a computer system to perform any one of the methods described herein.

An embodiment of the invention comprises or is a chipset performing any one of the methods described herein.

LIST OF REFERENCE SIGNS

100 Encoder
102 Input (e.g., input port, input interface)
103 Picture block
104 Residual calculation [unit or step]
105 Residual block
106 Transformation (e.g., additionally comprising scaling) [unit or step]
107 Transformed coefficients
108 Quantization [unit or step]
109 Quantized coefficients
110 Inverse quantization [unit or step]
111 De-quantized coefficients
112 Inverse transformation (e.g., additionally comprising scaling) [unit or step]
113 Inverse transformed block
114 Reconstruction [unit or step]
115 Reconstructed block
116 (Line) buffer [unit or step]
117 Reference samples
120 Loop filter [unit or step]
121 Filtered block
130 Decoded picture buffer (DPB) [unit or step]
142 Inter estimation (or inter picture estimation) [unit or step]
143 Inter estimation parameters (e.g., reference picture/reference picture index, motion vector/offset)
144 Inter prediction (or inter picture prediction) [unit or step]
145 Inter prediction block
152 Intra estimation (or intra picture estimation) [unit or step]
153 Intra prediction parameters (e.g., intra prediction mode)
154 Intra prediction (intra frame/picture prediction) [unit or step]
155 Intra prediction block
162 Mode selection [unit or step]
165 Prediction block (either inter prediction block 145 or intra prediction block 155)
170 Entropy encoding [unit or step]
171 Encoded picture data (e.g., bitstream)
172 Output (output port, output interface)
200 Decoder
202 Input (port/interface)
204 Entropy decoding
209 Quantized coefficients
210 Inverse quantization
211 De-quantized coefficients
212 Inverse transformation (scaling)
213 Inverse transformed block
214 Reconstruction (unit)
215 Reconstructed block
216 (Line) buffer
217 Reference samples
220 Loop filter (in loop filter)
221 Filtered block
230 Decoded picture buffer (DPB)
231 Decoded picture
232 Output (port/interface)
244 Inter prediction (inter frame/picture prediction)
245 Inter prediction block
254 Intra prediction (intra frame/picture prediction)
255 Intra prediction block
260 Mode selection
265 Prediction block (inter prediction block 245 or intra prediction block 255)
300 Coding system
310 Source device
312 Picture Source
313 (Raw) picture data 314 Pre-processor/Pre-processing unit
315 Pre-processed picture data
318 Communication unit/interface
320 Destination device
322 Communication unit/interface
326 Post-processor/Post-processing unit
327 Post-processed picture data
328 Display device/unit
330 transmitted/received/communicated (encoded) picture data

What is claimed is:

1. An apparatus for filtering a set of samples of an image using a loop filter with adaptive multiplier coefficients represented by integer numbers, the apparatus comprising processing circuitry which is configured to:
    determine a value of each multiplier coefficient of the loop filter so as to be within a set of allowed values so that a binary representation of an absolute value of each multiplier coefficient with a predetermined number of binary digits includes at least one "zero"; and
    filter the set of samples of the image with the loop filter,
    wherein the binary representation of the absolute value of each multiplier coefficient includes at most two "ones".

2. An apparatus according to claim 1, wherein a highest absolute value of the set is restricted to a predetermined maximum value.

3. An apparatus according to claim 1, wherein the binary representation of the absolute value of each multiplier coefficient includes at most one "one".

4. An apparatus according to claim 1, wherein all multiplier coefficients of the loop filter are determined to be within the set of allowed values.

5. An apparatus according to claim 1, wherein:
    the processing circuitry is further configured to group the multiplier coefficients of the loop filter into at least two groups, and
    the multiplier coefficients of one of the at least two groups is restricted to the set of allowed values.

6. An apparatus according to claim 5, wherein the multiplier coefficients of another one of the at least two groups are allowed to assume all values within a range defined by a predetermined maximum of the absolute value.

7. An apparatus according to claim 1, wherein the set of samples of the image is a set of samples of a video image.

8. An apparatus according to claim 7, wherein the processing circuitry is configured to individually adapt the multiplier coefficients for each picture and each pixel.

9. A method for filtering a set of samples of an image using a loop filter with adaptive multiplier coefficients represented by integer numbers, the method comprising:
    determining a value of each multiplier coefficient of the loop filter so as to be within a set of allowed values so that a binary representation of an absolute value of each multiplier coefficient with a predetermined number of binary digits includes at least one "zero"; and
    filtering the set of samples of the image with the loop filter,
    wherein the binary representation of the absolute value of each multiplier coefficient includes at most two "ones".

10. An apparatus for encoding a current set of samples of an image including a plurality of pixels, the apparatus comprising:
    an encoder with a decoder for reconstructing the current set; and
    an apparatus for filtering the reconstructed set using a loop filter with adaptive multiplier coefficients represented by integer numbers, the apparatus comprising processing circuitry which is configured to:
    determine a value of each multiplier coefficient of the loop filter so as to be within a set of allowed values so that a binary representation of an absolute value of each multiplier coefficient with a predetermined number of binary digits includes at least one "zero"; and
    filter the reconstructed set with the loop filter,
    wherein the binary representation of the absolute value of each multiplier coefficient includes at most two "ones".

11. An apparatus according to claim 10, wherein the processing circuitry is further configured to:
    map the values of the adaptive multiplier coefficients to binary codewords; and
    include the codewords into a bit stream for being transmitted to a decoding apparatus.

12. An apparatus according to claim 11, wherein a length of the codewords depends on a number of distinct multiplier coefficient values.

13. An apparatus according to claim 11, wherein the processing circuitry is further configured to:
    perform a prediction of the adaptive multiplier coefficients of the loop filter; and
    determine residual multiplier coefficients by comparing actually determined values with predicted values resulting from the prediction, wherein the mapping to the binary codewords is applied to the residual multiplier coefficients.

14. An apparatus according to claim 13, wherein the processing circuitry is further configured to generate prediction control information and to include the prediction control information into the bit stream.

15. An apparatus for decoding a coded current set of samples of an image including a plurality of pixels, the apparatus comprising:
    a decoder for reconstructing the current set; and
    an apparatus for filtering the reconstructed current set using a loop filter with adaptive multiplier coefficients represented by integer numbers, the apparatus comprising processing circuitry which is configured to:
    determine a value of each multiplier coefficient of the loop filter so as to be within a set of allowed values so that a binary representation of an absolute value of each multiplier coefficient with a predetermined number of binary digits includes at least one "zero"; and
    filter the reconstructed current set with the loop filter,
    wherein the binary representation of the absolute value of each multiplier coefficient includes at most two "ones".

16. An apparatus according to claim 15, wherein the processing circuitry is further configured to obtain multiplier coefficients from binary codewords included in a received bit stream by applying a mapping operation.

17. An apparatus according to claim 16, wherein:
    the obtained multiplier coefficients are residual multiplier coefficients representing a difference between actual coefficient values and multiplier coefficients predicted according to a prediction scheme; and
    the processing circuitry is configured to determine values of the multiplier coefficients of the loop filter by reconstructing them from the obtained residual multiplier coefficients.

18. An apparatus according to claim 17, wherein:
    the prediction scheme is indicated by prediction control information further included in the received bit stream; and
    the processing circuitry is configured to further use the prediction control information in the reconstruction.

19. An apparatus according to claim 16, wherein the determination by the processing circuitry further comprises:
performing a determination as to whether or not a value of each multiplier coefficient, obtained directly from the received bit stream by the mapping operation or by reconstruction from the obtained residual multiplier coefficients, are within the set of allowed values; and, if not,
converting the value to a nearest value that is within the set of allowed values.

* * * * *